Oct. 26, 1965  J. F. SWIFT ETAL  3,213,620
HYDROMECHANICAL POWER TRANSMISSION
Filed July 22, 1964  19 Sheets-Sheet 9

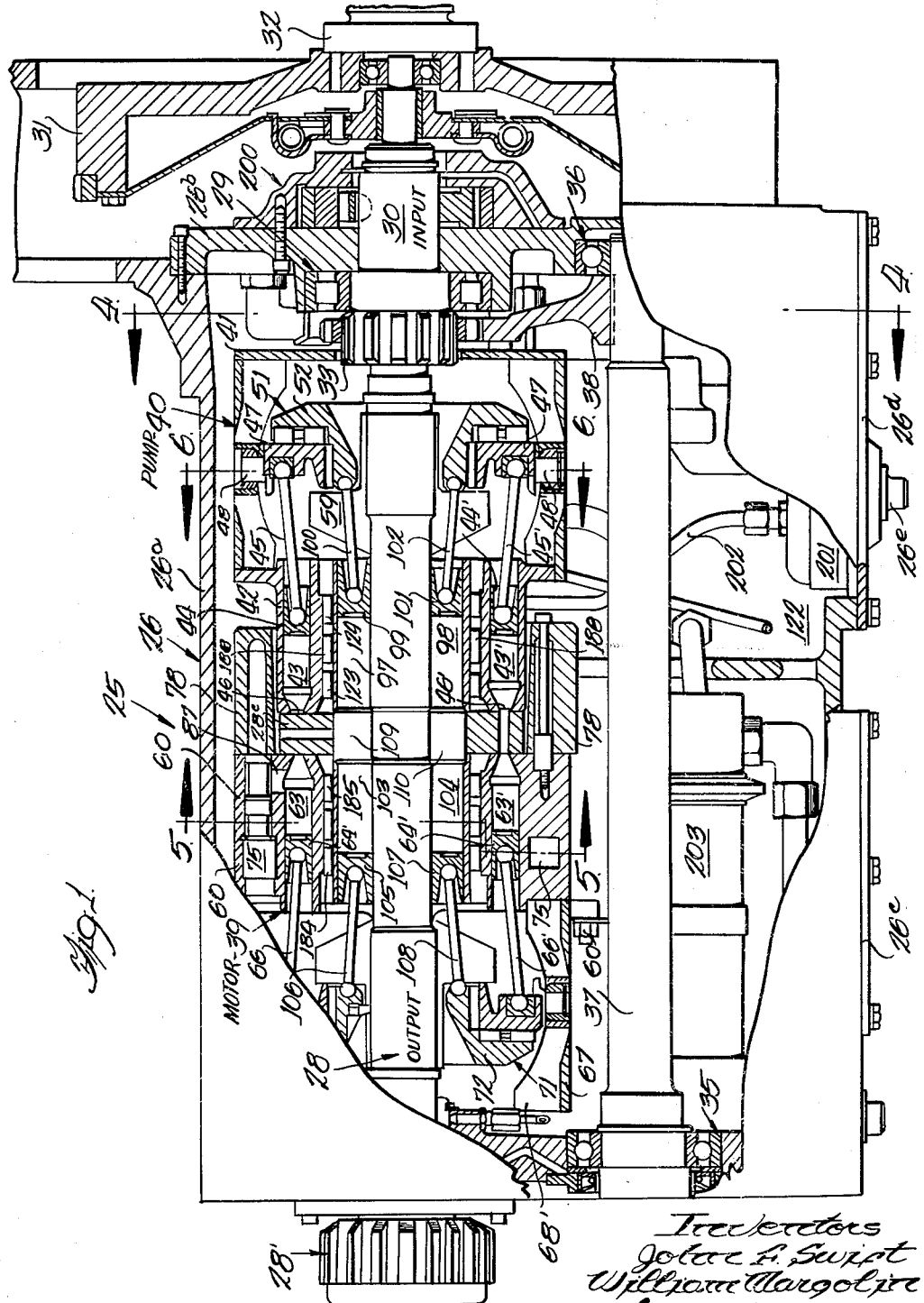

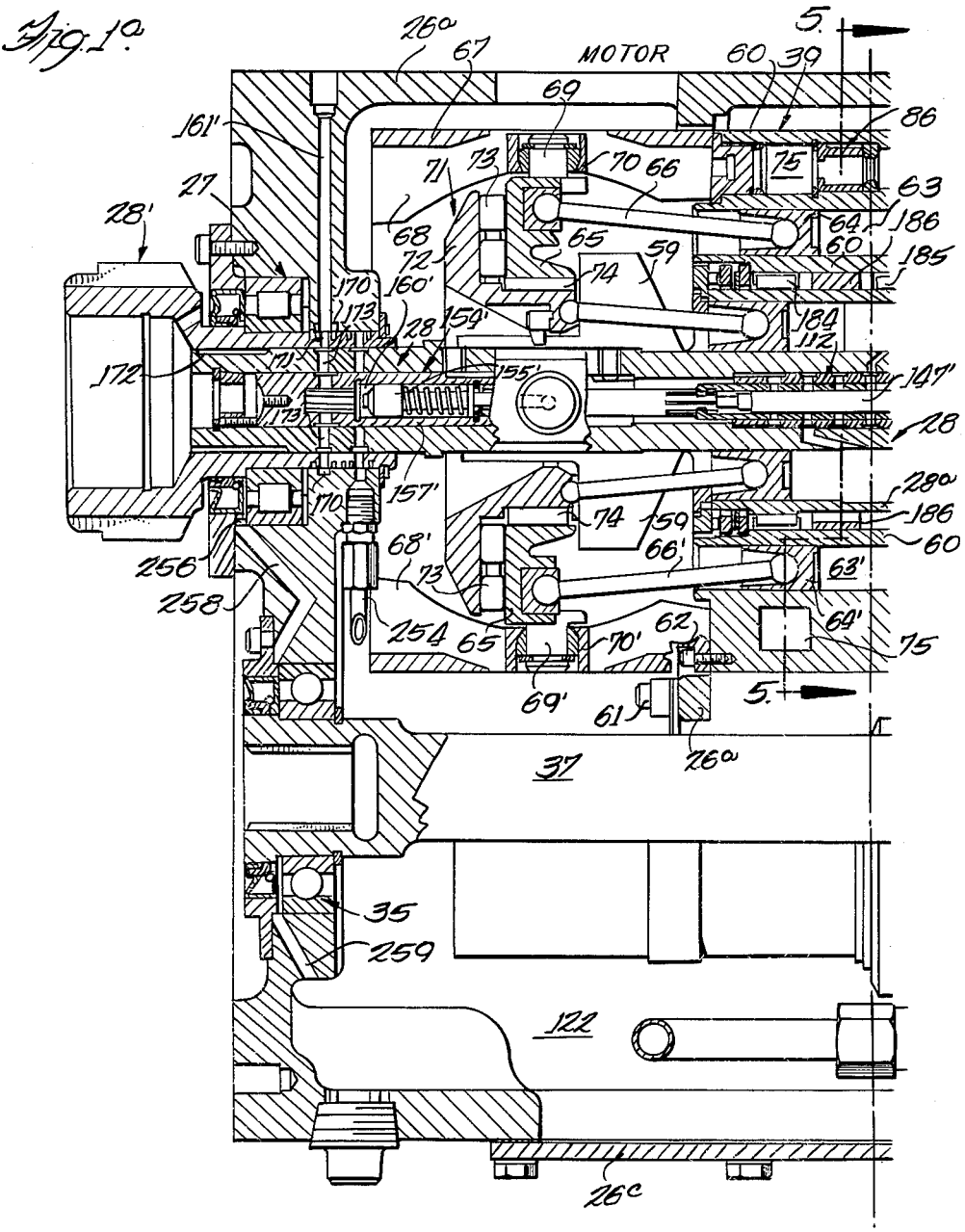

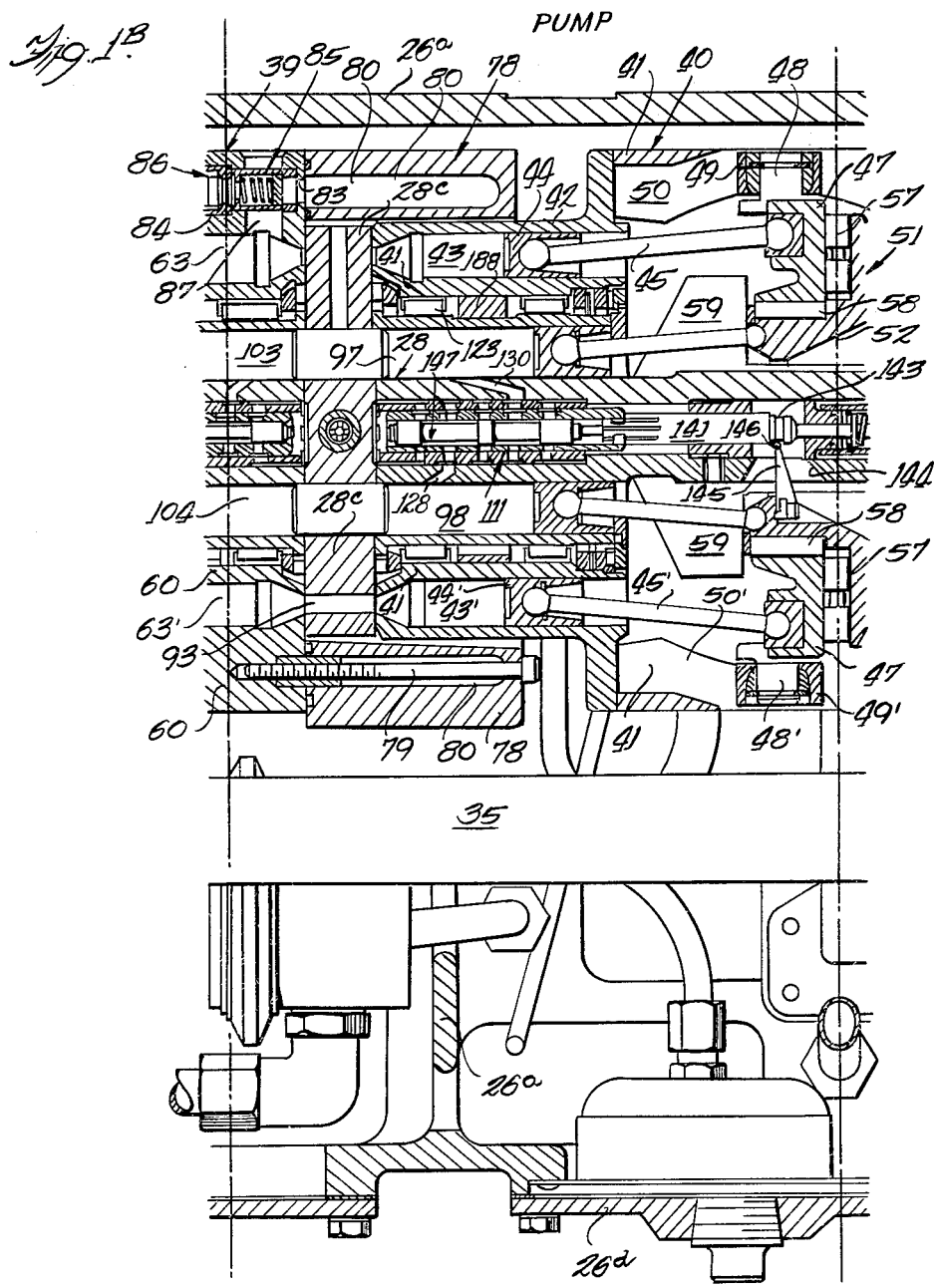

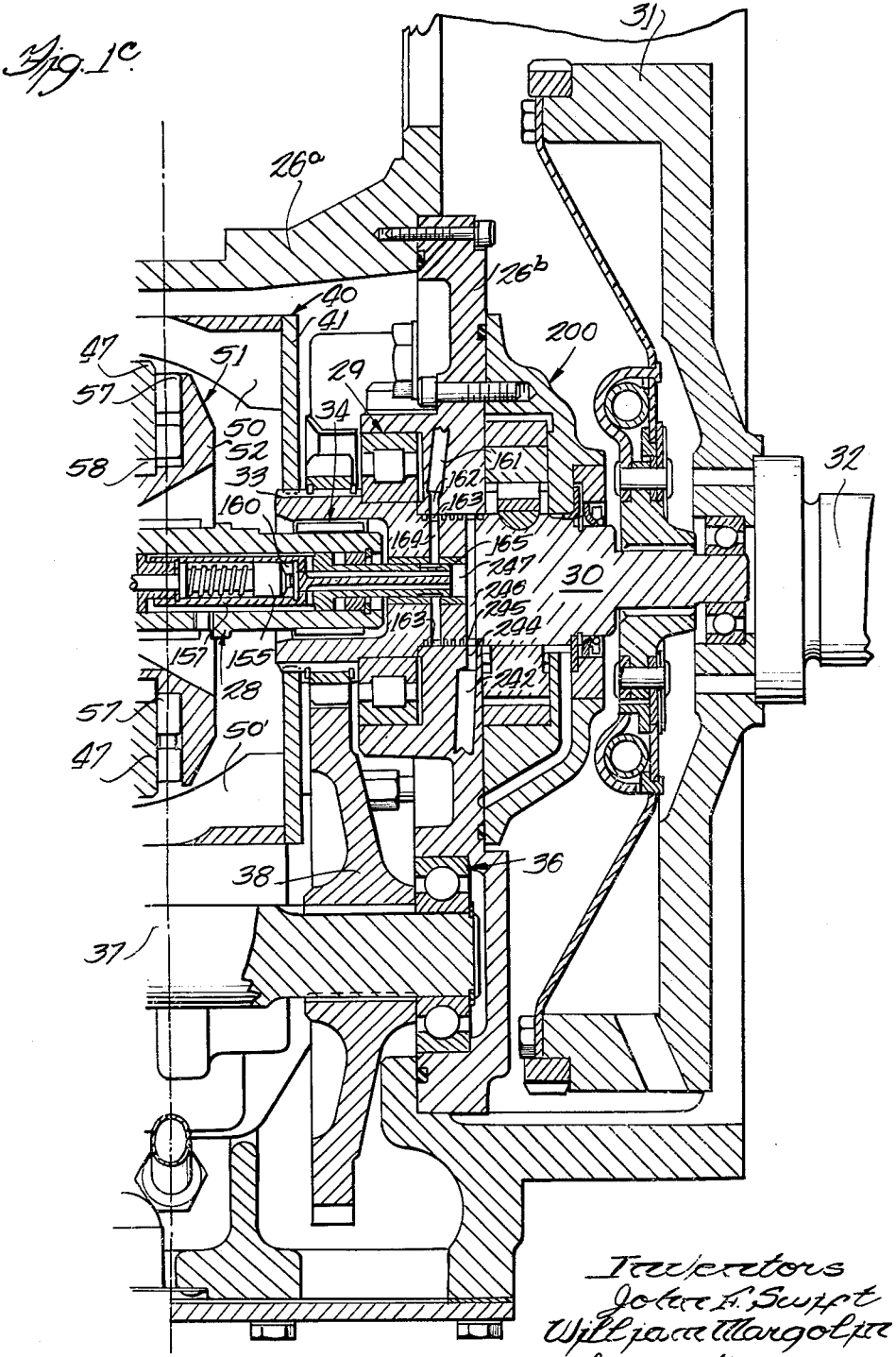

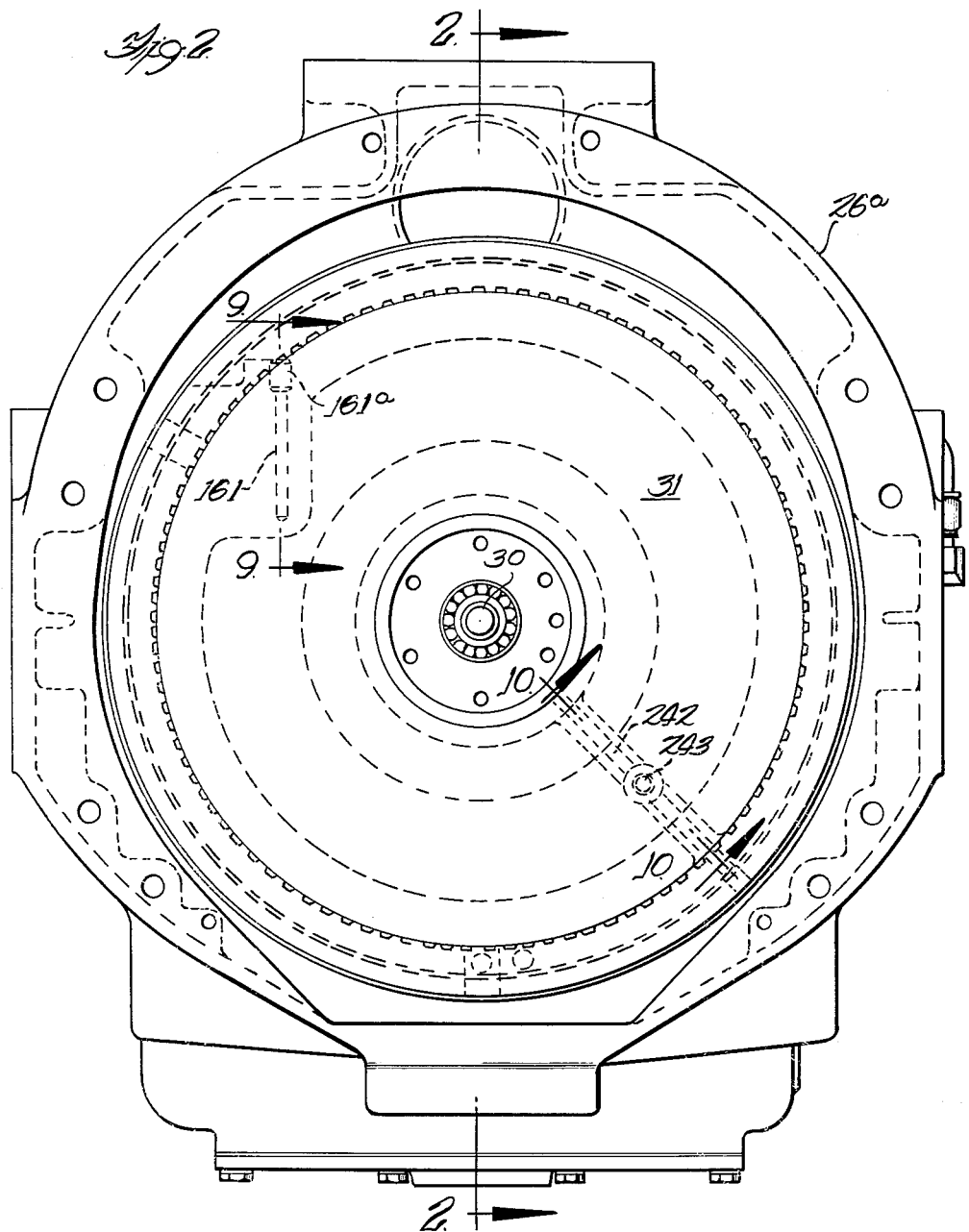

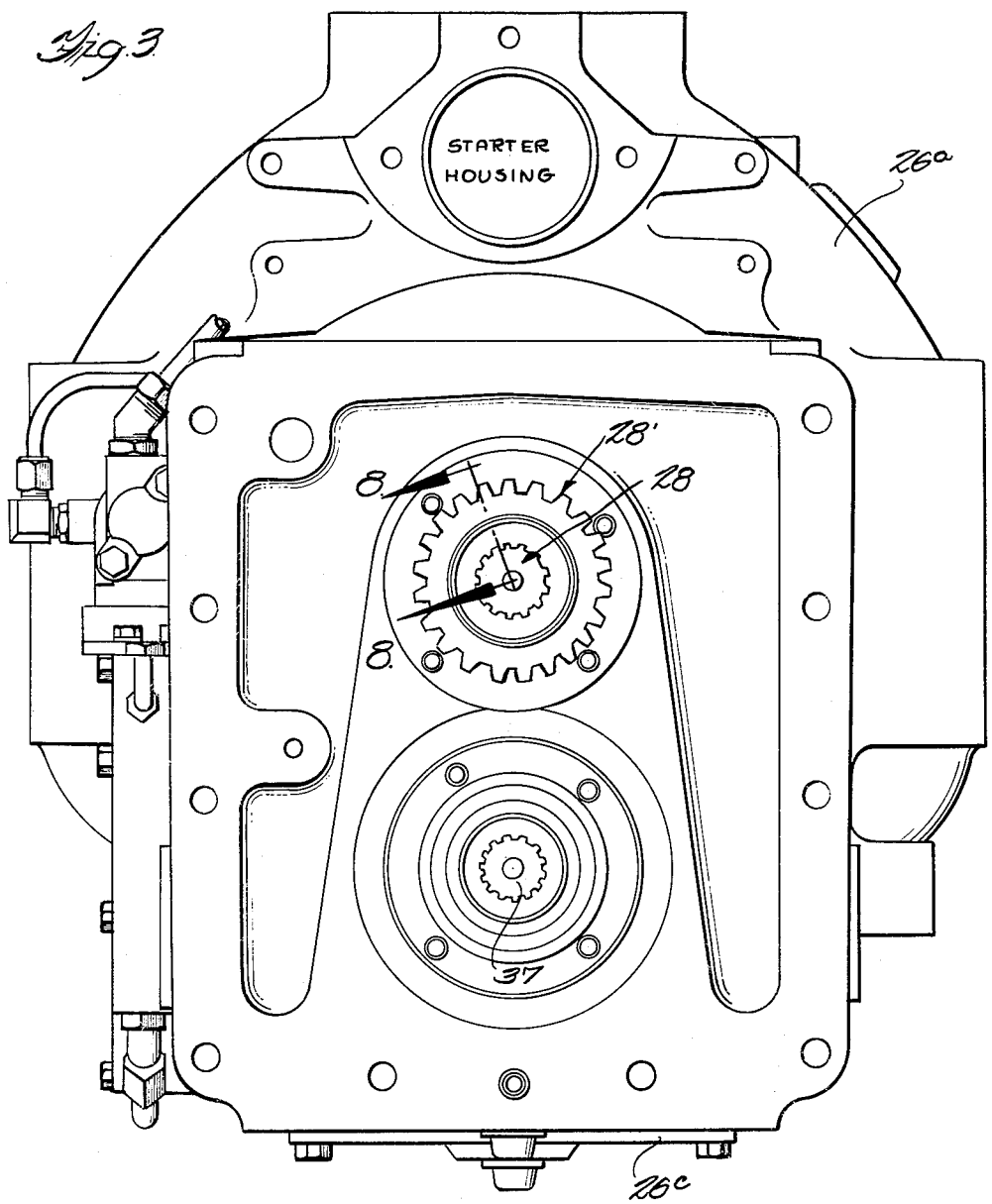

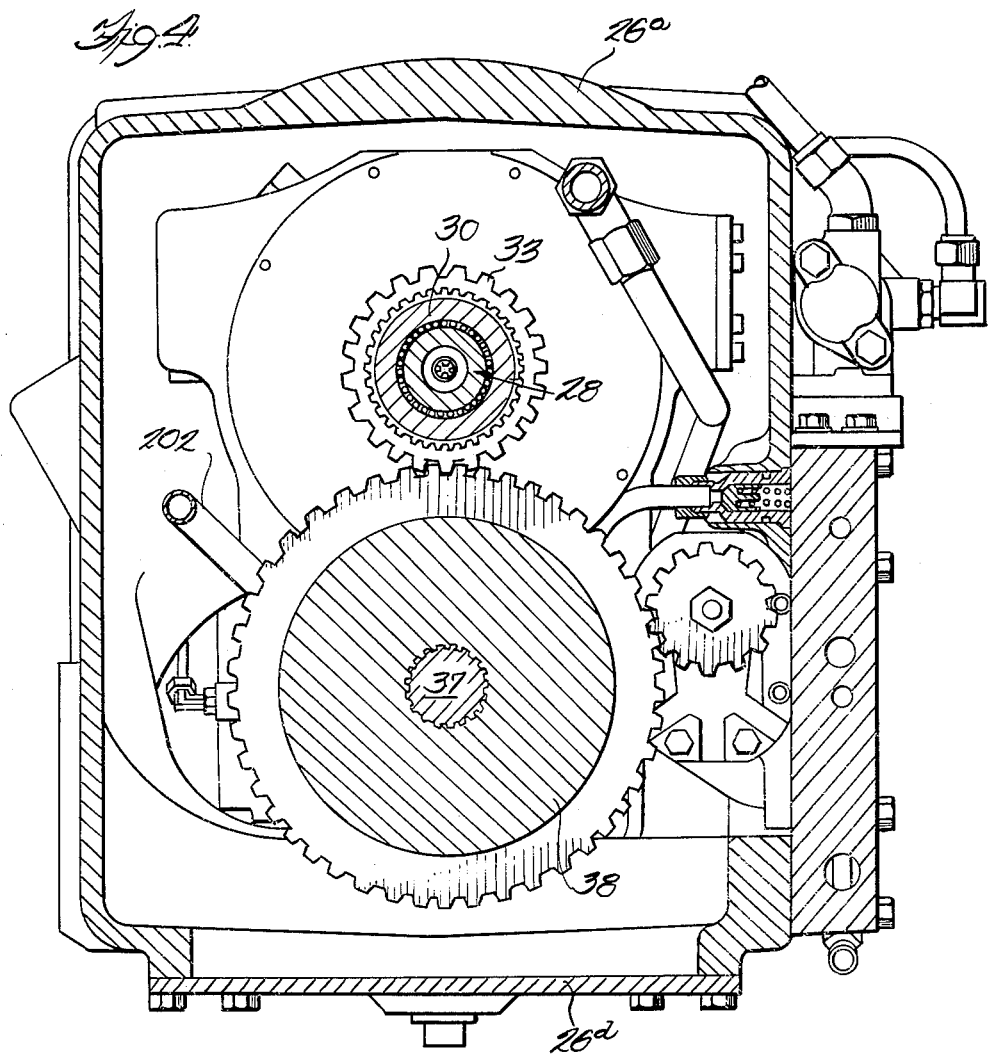

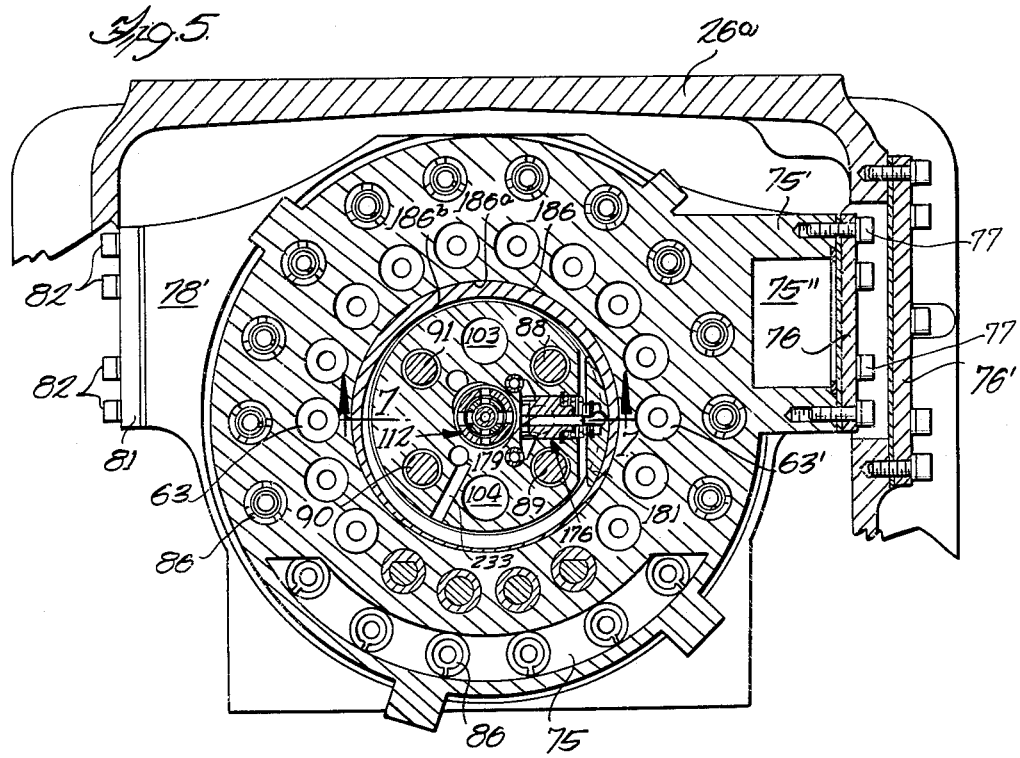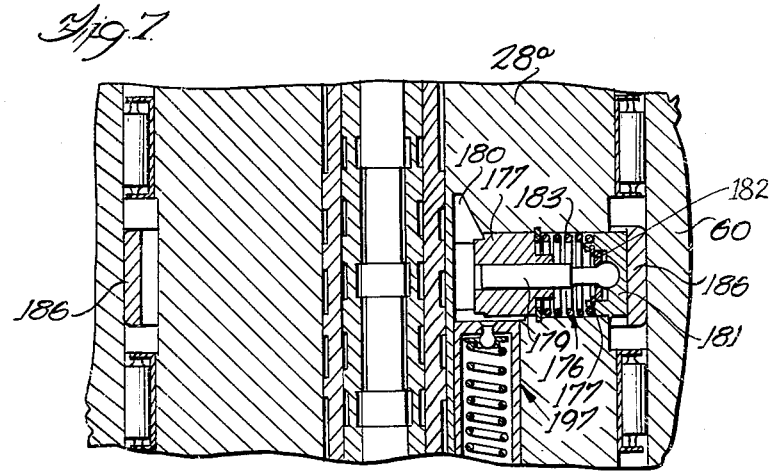

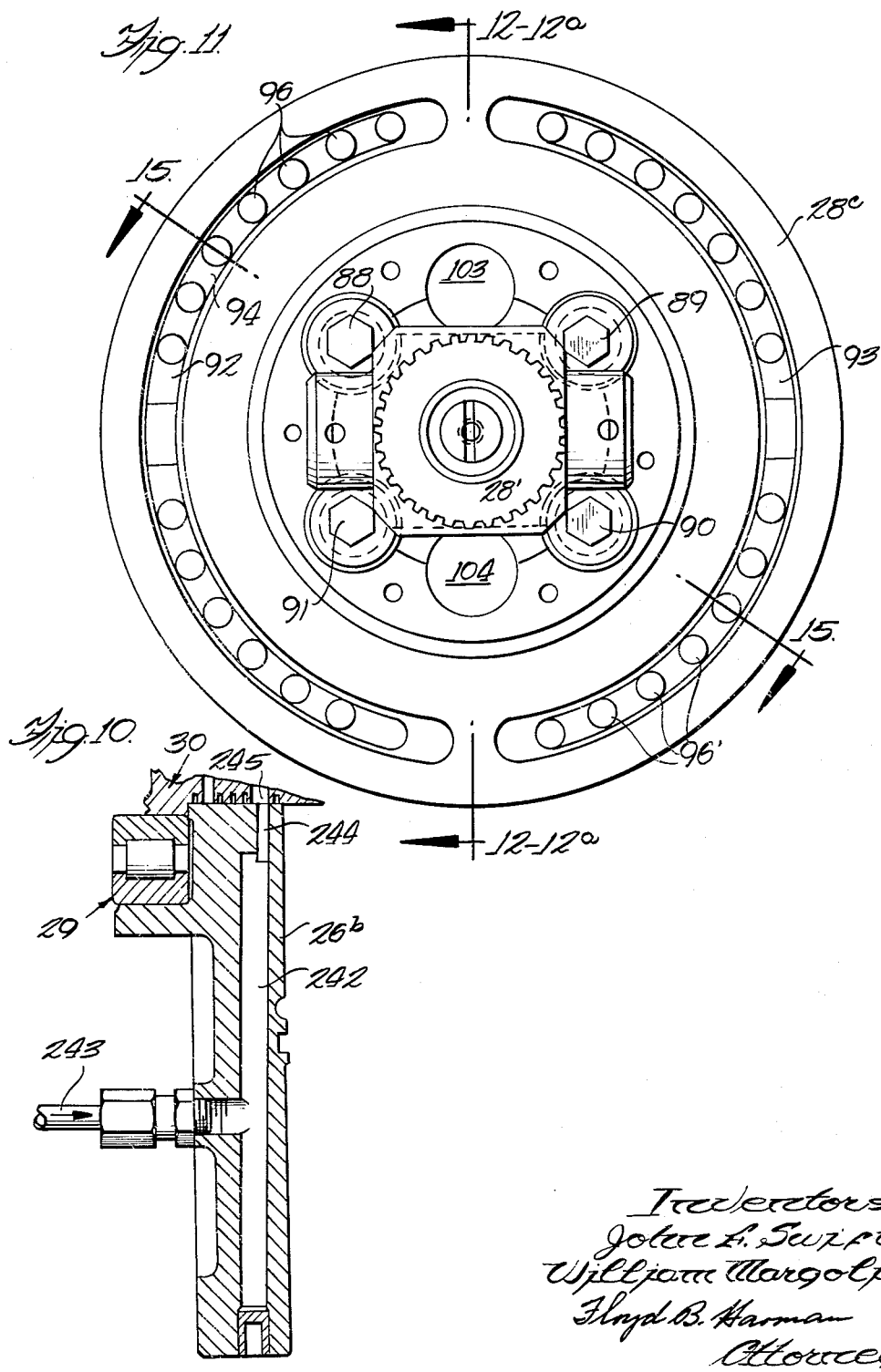

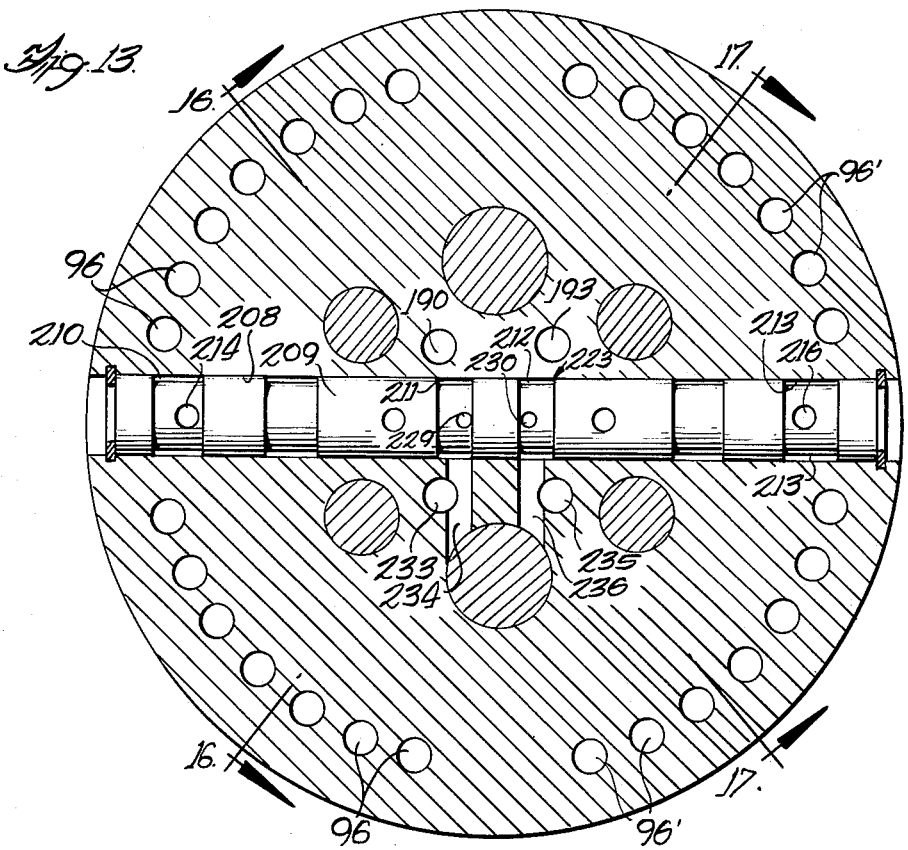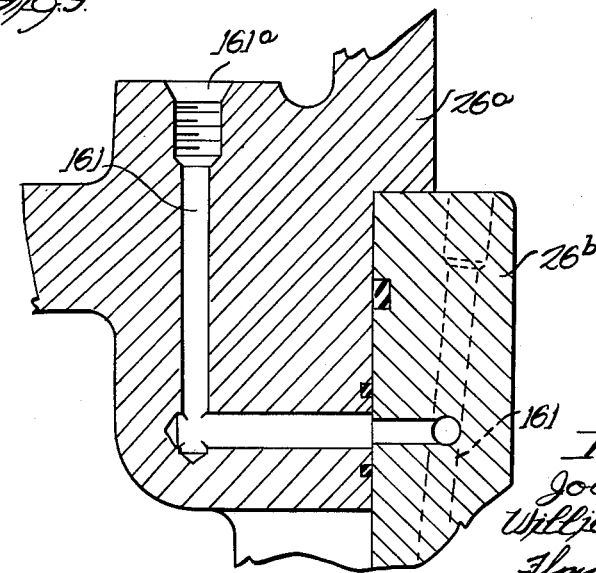

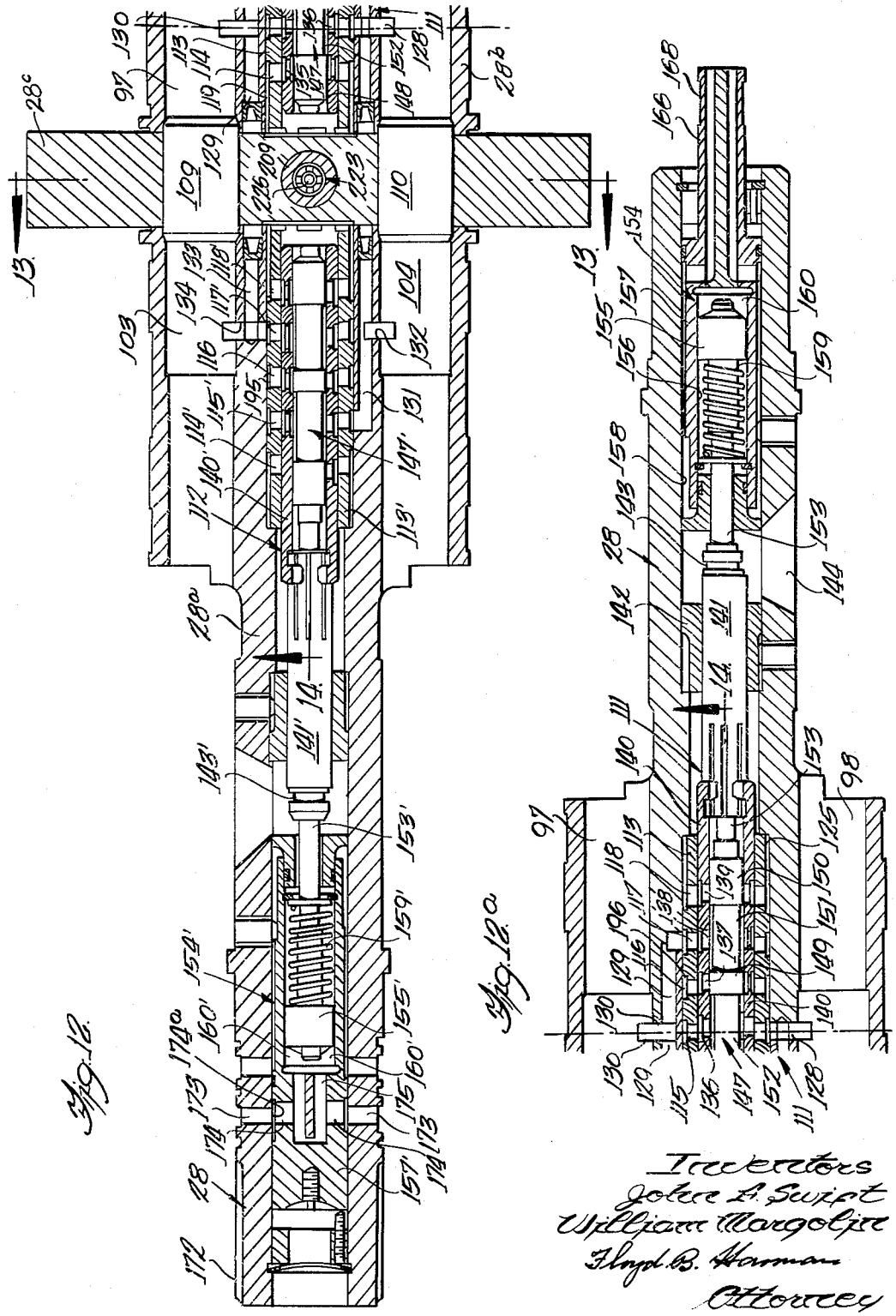

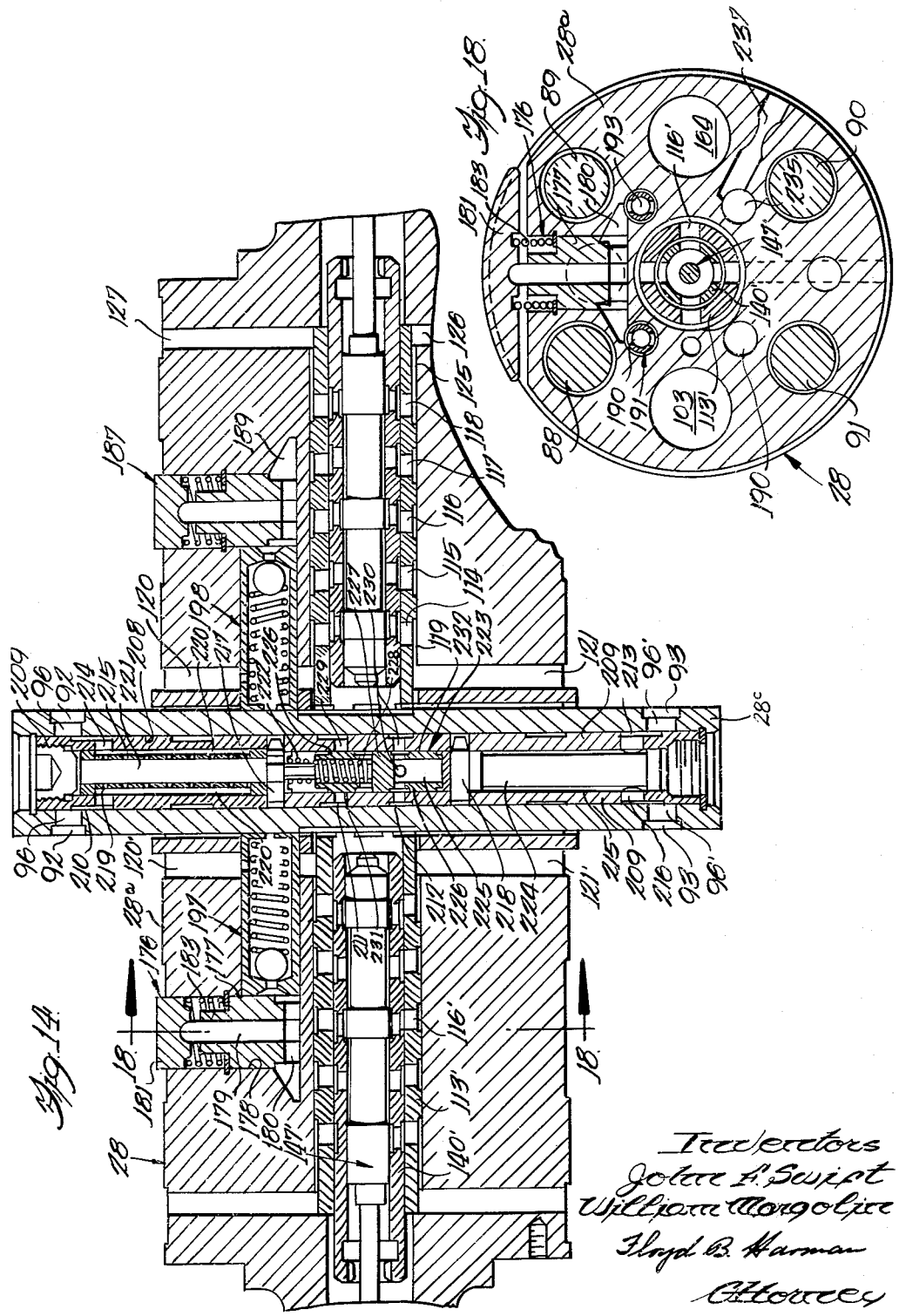

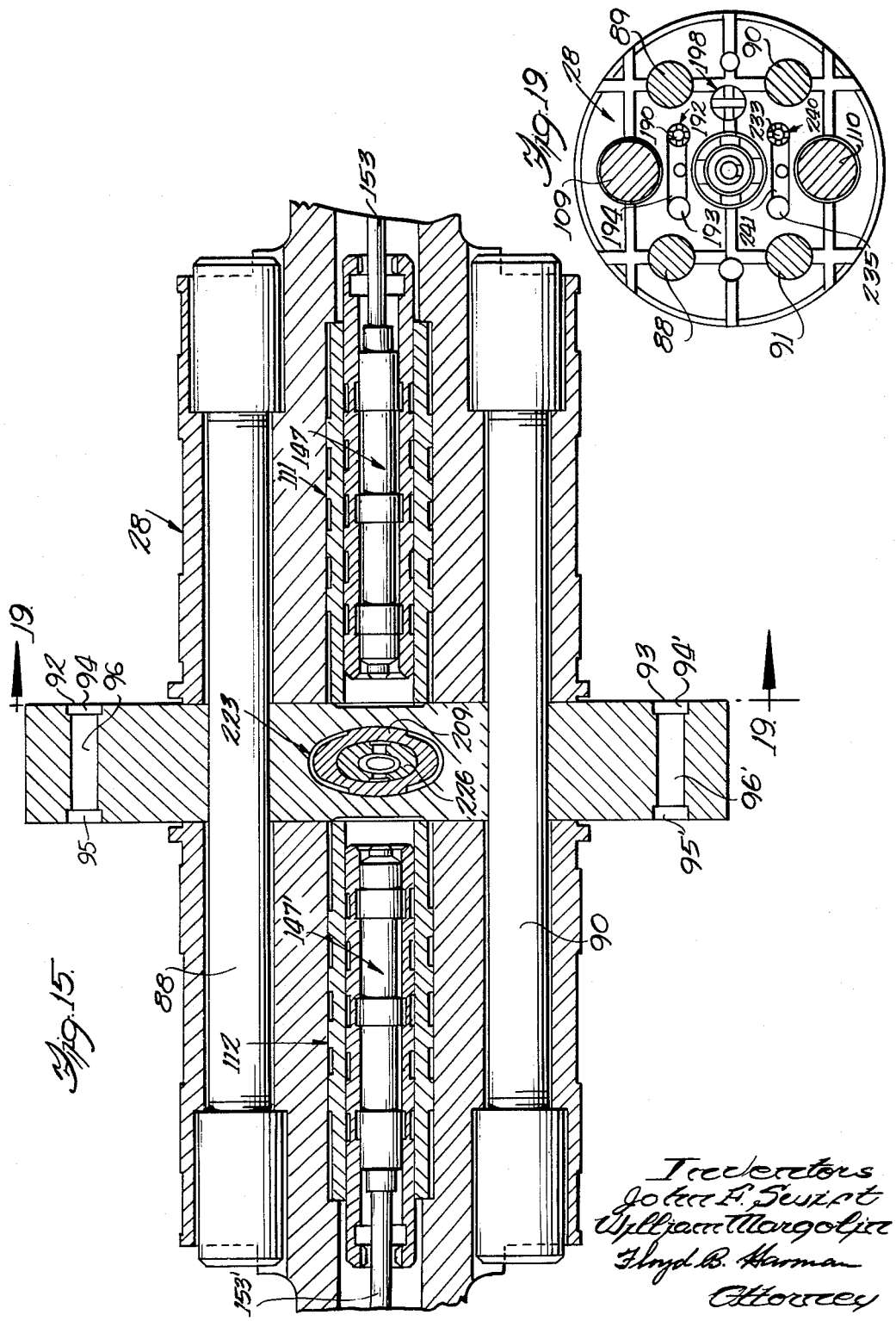

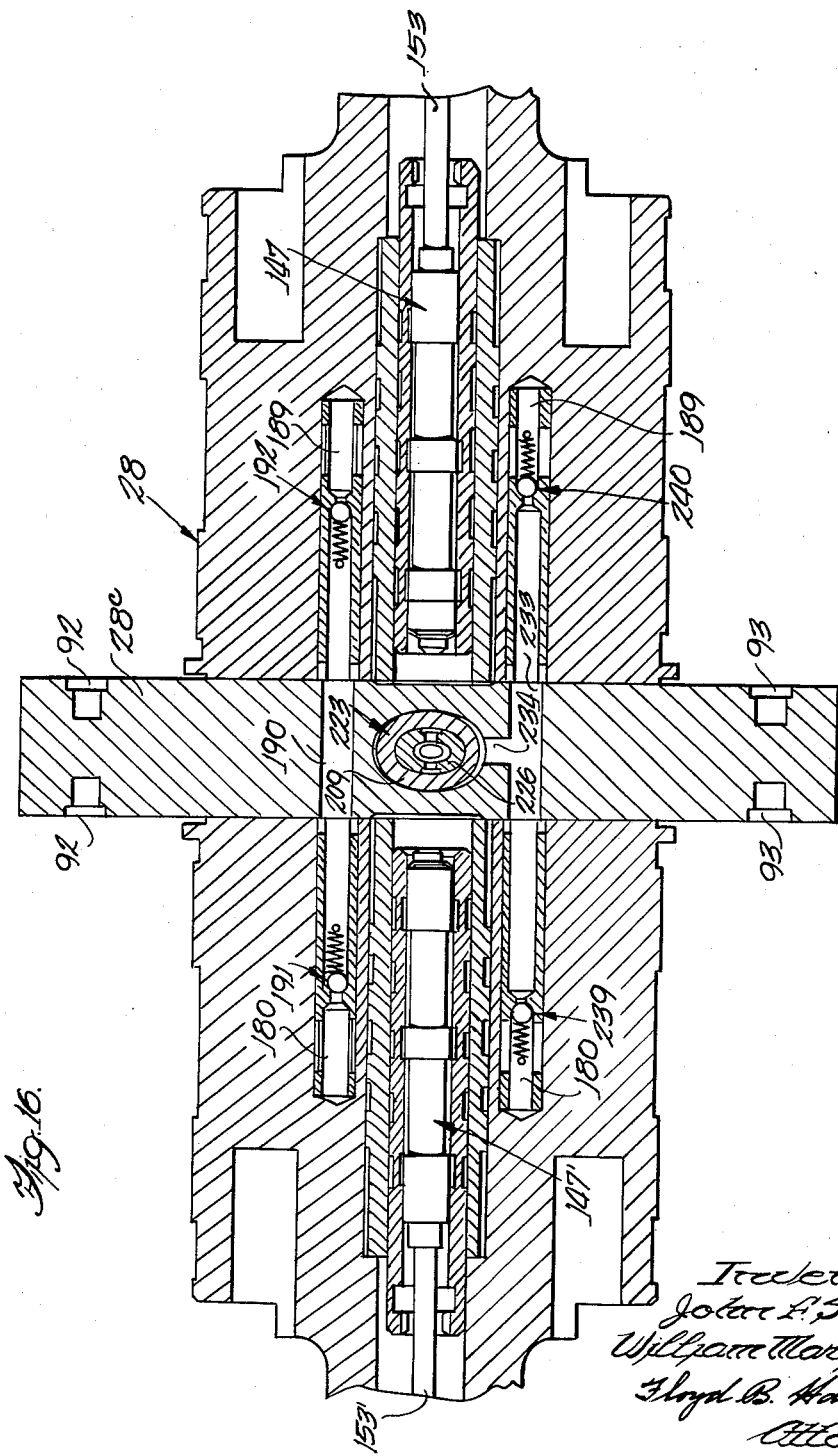

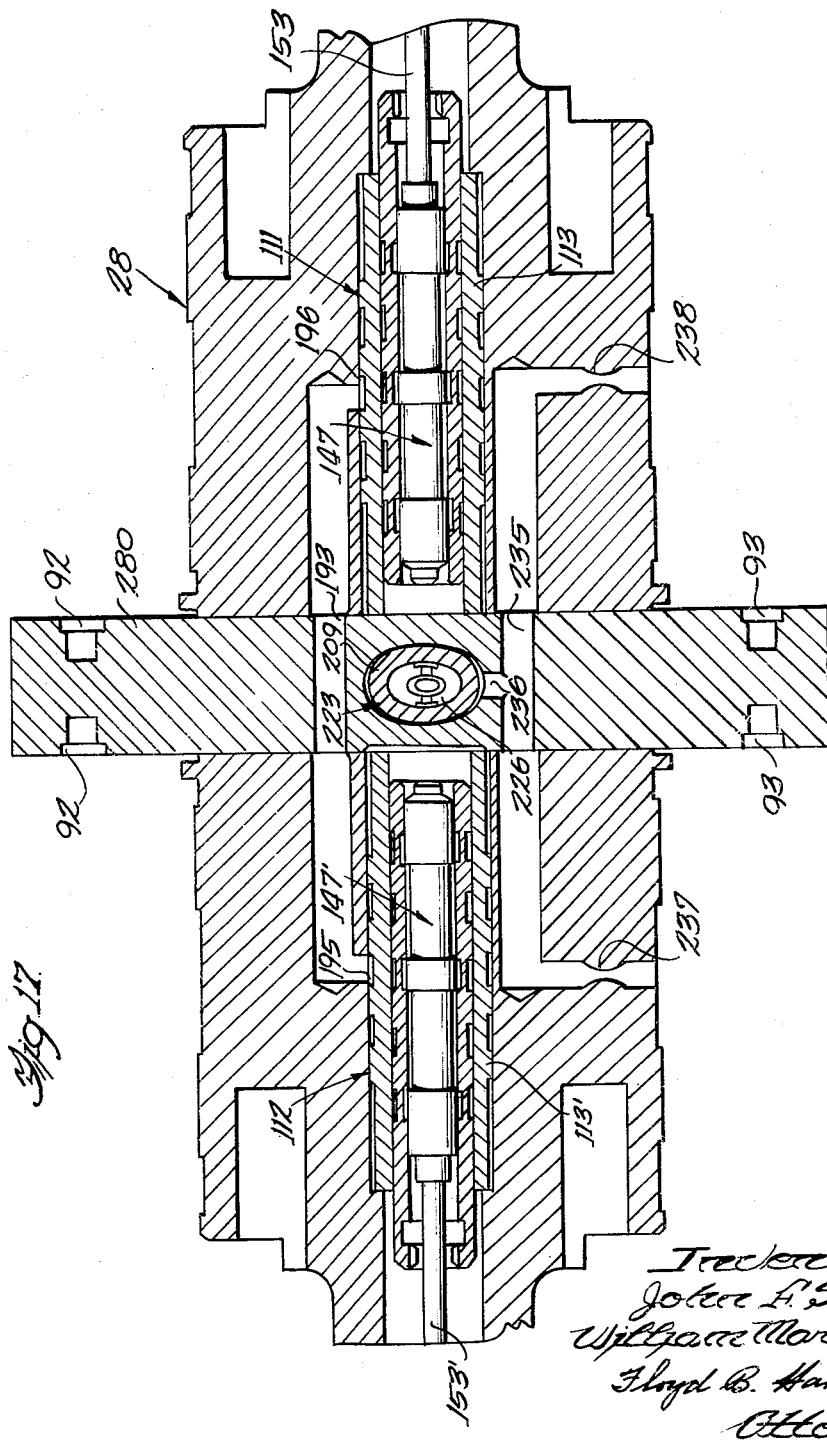

Oct. 26, 1965   J. F. SWIFT ETAL   3,213,620
HYDROMECHANICAL POWER TRANSMISSION
Filed July 22, 1964   19 Sheets-Sheet 17
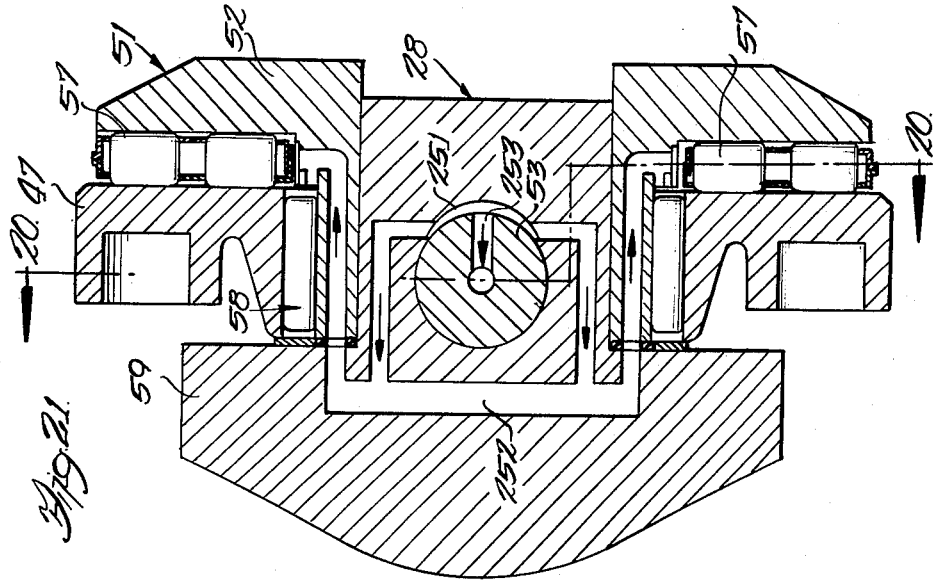
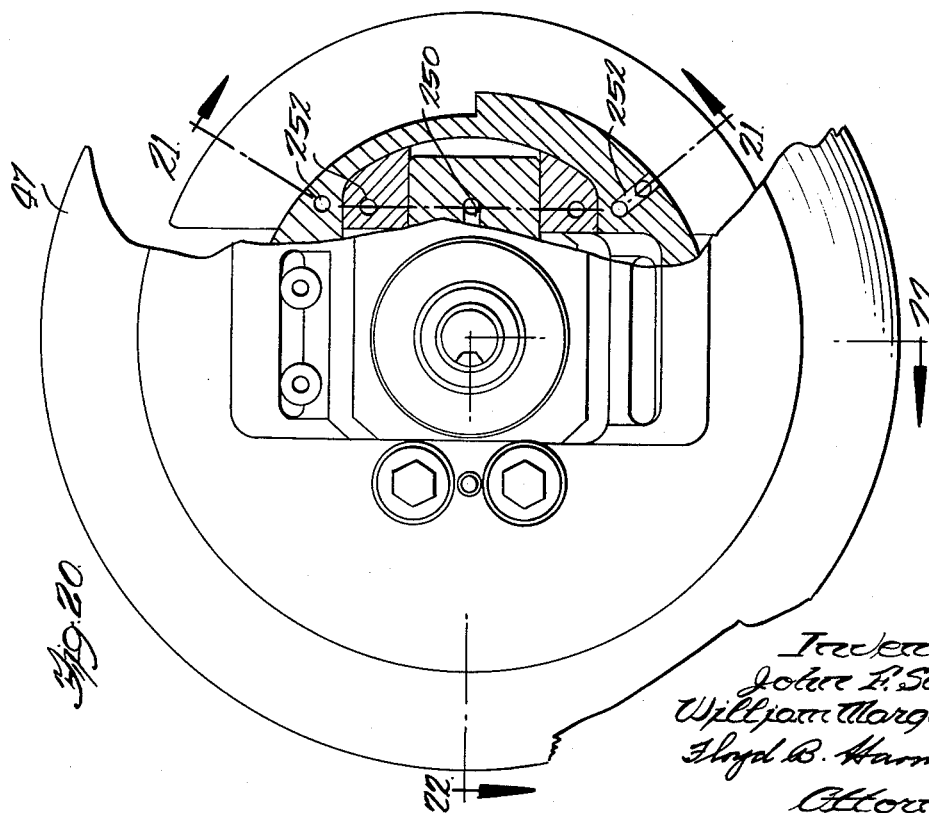

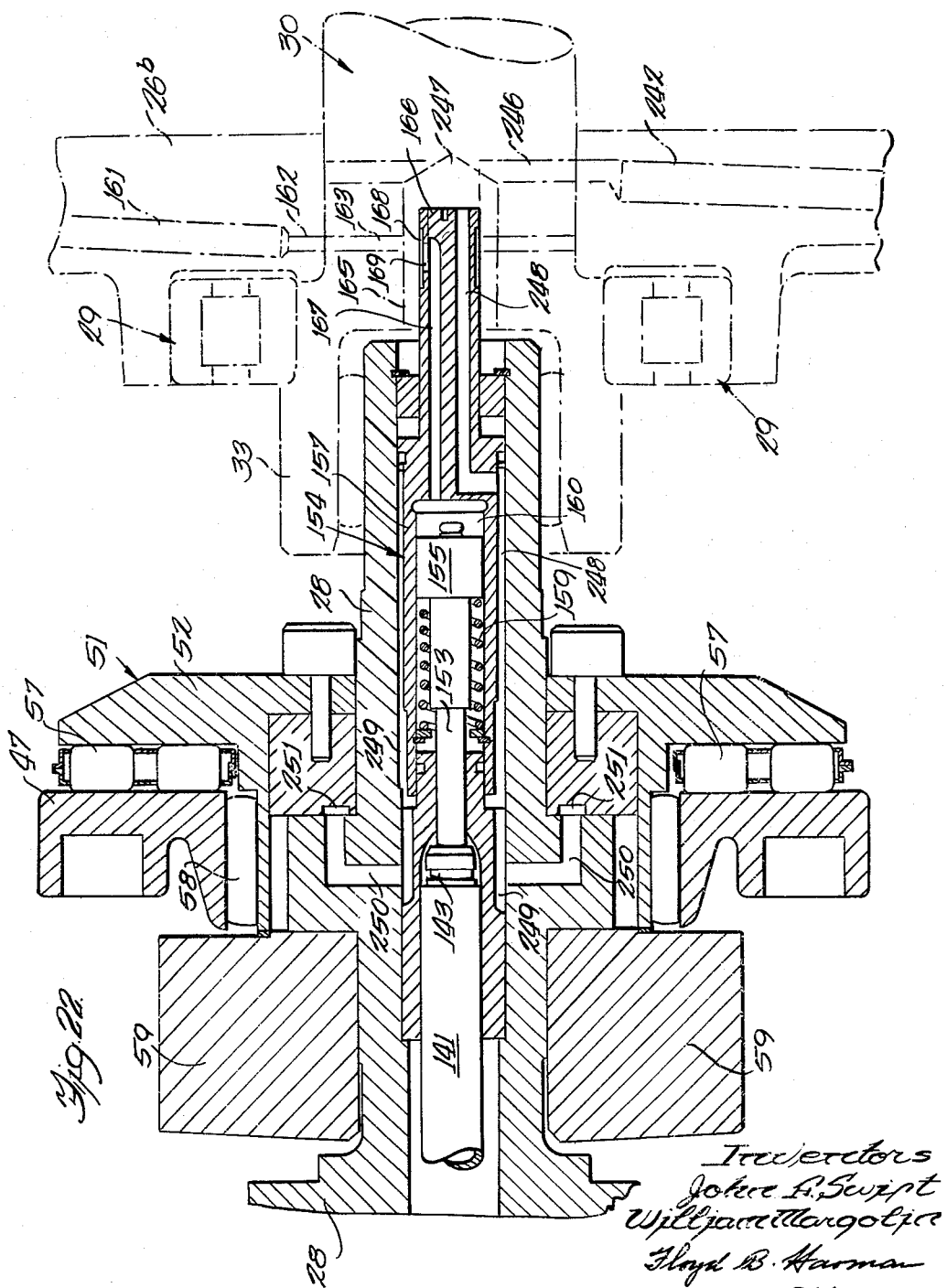

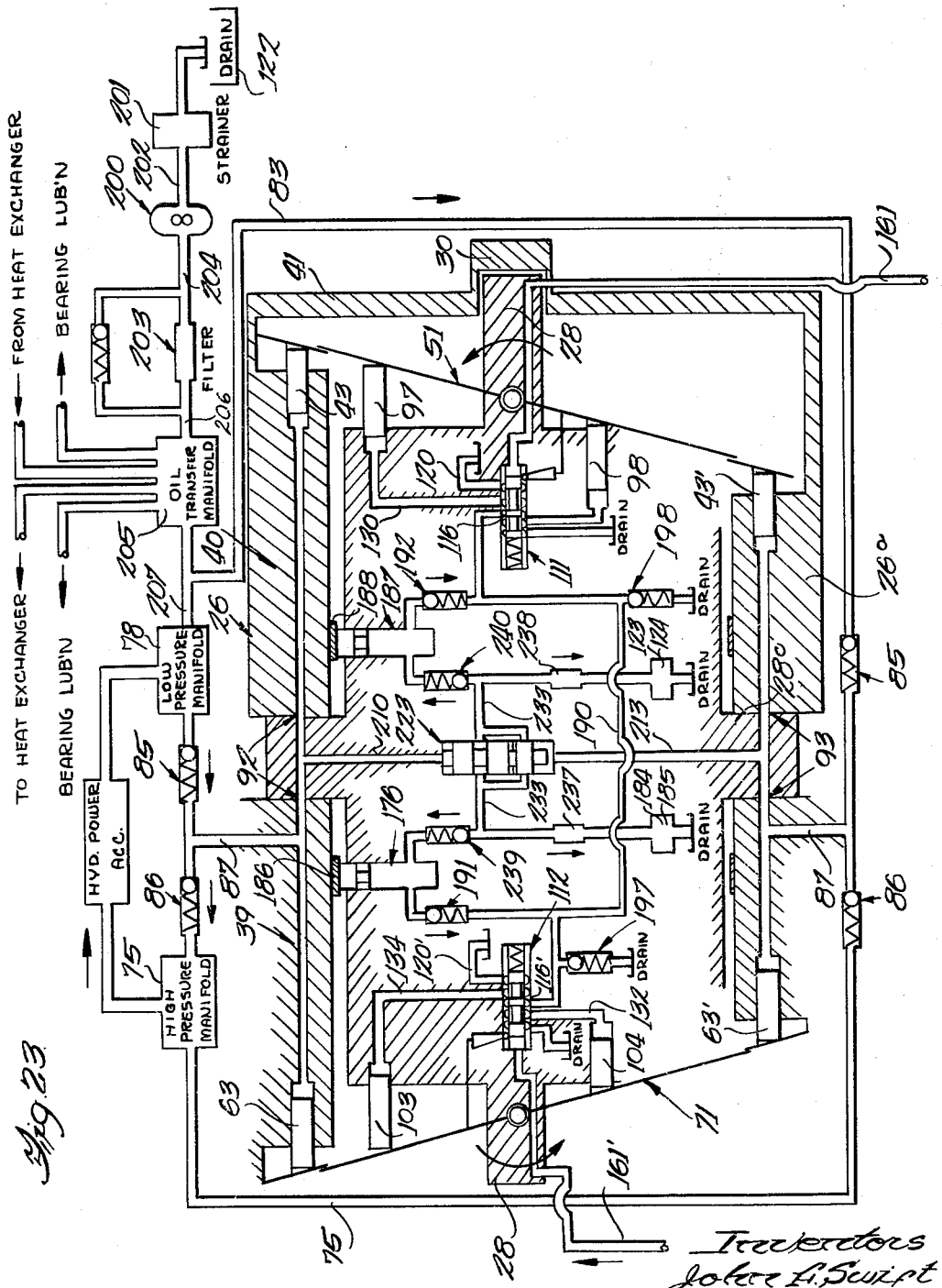

United States Patent Office 3,213,620
Patented Oct. 26, 1965

3,213,620
HYDROMECHANICAL POWER TRANSMISSION
John F. Swift and William Margolin, Chicago, Ill., assignors to International Harvester Company, Chicago, Ill., a corporation of New Jersey
Filed July 22, 1964, Ser. No. 384,472
25 Claims. (Cl. 60—53)

This invention relates to an infinitely variable speed ratio hydraulic power transmission. More in particular this invention relates to improved means for hydraulically controlling the angular displacement of the swash plates whereby hydraulic control is available under all possible operating conditions of the transmission independent of the hydraulic working circuit.

Hydromechanical power transmissions differ from hydrostatic power transmissions in at least one major respect. Transmission of power in a hydrostatic transmission is entirely dependent upon the movement or flow of hydraulic fluid under pressure under all operating conditions. Contrary to that of a hydrostatic transmission a hydromechanical transmission is provided with a force-reacting means which in effect divides the power train into two separate paths, one being mechanical and the other hydrostatic. When a hydromechanical power transmission is in 1:1 forward speed ratio, i.e., direct drive) the power transmitted hydrostatically is zero as the unit is hydraulically locked (i.e., no flow of hydraulic fluid) and thus the entire transmission of power is mechanical. At the other speed ratios the power transmitted is partly hydrostatic and the balance mechanical.

Hydromechanical transmissions of the type described herein, and further described in copending applications Serial No. 173,392 filed on February 15, 1962, now Patent No. 3,151,456, and Serial No. 209,149 filed on July 11, 1962, now Patent No. 3,157,995, have an axial piston type pump connected to at least one axial piston type motor and the displacement of these pistons is controlled by movable or angularly displaceable swash plates. Where the angular displacement of each swash plate is controlled by appropriately energizing hydraulic means such as one or more hydraulic rams, the energizing fluid pressure may be obtained from the fluid pressure working circuit of the transmission. Such a source of fluid under pressure for controlling the angular displacement is satisfactory for most operating conditions. However, if the transmission is in neutral (i.e., zero pump displacement) there exists no pressure differential in the hydraulic working circuit of the transmission and hence cannot energize the hydraulic means for shifting the angular displacement of the swash plates. To overcome this problem it is known to provide a low pressure (e.g., 100 p.s.i.) charge pump in drive relation with the input shaft of the transmission. This low pressure charge pump serves the triple purpose of providing sufficient energization of the swash plate hydraulic control means to initiate positive displacement o fthe axial piston pump from the neutral position thus creating a pressure differential in the hydraulic working circuit of the transmission which in turn provides high pressure to the swash plate control means, as well as providing leakage replacement fluid to the working circuit and forced lubrication. However, there are other operating conditions where there exists no pressure differential in the hydraulic working circuit of the transmission and the low pressure charge pump is either inoperative or provides insufficient pressure to control the displacement of the swash plates.

In a self-propelled vehicle such as a tractor or a truck having a hydromechanical transmission employed in its propelling power train suppose, for example, the vehicle is coasting under such conditions that no power is being transmitted through the transmission. This condition can occur when the vehicle is moving at a speed in which the transmission's output shaft rotates in matched ratio with the input shaft connected to the engine of the vehicle. Now at this point the operator wishes to employ the transmission to brake the vehicle by shifting the displacement of the swash plates. However, since no power is being actually transmitted through the transmission there is no pressure differential in the hydraulic working circuit thereof and hence the only fluid pressure available for actuating the swash plate hydraulic control means is from the low pressure charge pump. But the moment the operator attempts to change the angular displacement of one or more swash plates the hydraulic rams of the control means are hydraulically unlocked and the hydraulic pressure from the charge pump is often far too low and hence control of the swash plate is lost. Employing a high pressure charge pump to circumvent this condition is not satisfactory because the charge pump serves to replenish fluid on the low pressure side of the transmission's working circuit and if high pressure is used to replenish fluid then the pressure differential of the working circuit operating under normal conditions would be reduced and thus efficiency of the transmission would be greatly reduced. Furthermore, since the charge pump is conventionally driven by the transmission's input shaft if the vehicle engine stops during the aforementioned condition, there would be no fluid pressure available in the transmission at all.

The principal object of the present invention is to provide a low volumetric capacity source of fluid under high pressure for energizing the hydraulic means for controlling the angular displacement of the swash plates in a hydraulic transmission under all operating conditions.

A further important object of the present invention is to provide an internal source of low volumetric capacity high pressure fluid for operating the hydraulic means for controlling the angular displacement of the swash plates in a hydraulic transmission under all operating conditions.

Another object of the present invention is to provide a source of high pressure fluid according to the preceding objects which is operatively independent of any fluid pressure differential in the working circuit of the hydromechanical transmission.

Still another object of the invention is to provide a source of high pressure fluid in a hydraulic transmission according to the preceding objects comprising two small low capacity high pressure auxiliary or control pumps one of which is actuated by the relative motion between the input shaft and the output shaft and the other being acuated by the relative motion between the output shaft and the stationary housing of the transmission.

A yet further object of the invention is to provide a source of high pressure fluid in a hydraulic transmission according to the preceding object wherein both auxiliary or control pumps are interconnected cumulatively.

Another object of the present invention is to provide a source of high pressure fluid in a hydraulic transmission according to preceding objects wherein a shuttle valve is provided for automatically connecting the inlet sides of both auxiliary or control pumps with the low pressure side of the transmission's working circuit.

These and other desirable objects inherent in and encompassed by the invention will become more apparent from the ensuing description of a preferred embodiment, the appended claims and the annexed drawings wherein:

FIGURE 1 is a longitudinal sectional view, partly broken away, illustrating the general assembly arrangement of a hydromechanical power transmission embodying the present invention;

FIGURES 1A, 1B and 1C which when taken compositely represents an enlarged view of FIGURE 1 illustrating the hydromechanical power transmission assembly in greater detail;

FIGURE 2 is a rightward end view of the hydromechanical transmission of FIGURE 1 with the engine crankshaft removed;

FIGURE 3 is a leftward end view of the hydromechanical transmission of FIGURE 1;

FIGURE 4 is a transverse sectional view, partly broken away, taken on line 4—4 of FIGURE1;

FIGURE 5 is a transverse sectional view, partly broken away, taken on line 5—5 of FIGURE 1 illustrating construction details of one of the auxiliary high pressure control pumps of the present invention;

FIGURE 7 is a sectional view, partly broken away, taken on line 7—7 of FIGURE 5 illustrating further construction details of one of the auxiliary high pressure control pumps;

FIGURE 9 is a sectional view, partly broken away, taken on line 9—9 of FIGURE 2 illustrating fluid passage means for control signal pressure for actuating a control valve to regulate the angular displacement of the swash plate of the transmission's main or power pump;

FIGURE 10 is a sectional view, partly broken away, taken on line 10—10 of FIGURE 2 illustrating a position of the means for lubricating the bearings of the swash plate of the transmission's main or power pump;

FIGURE 11 is a leftward end view of the output shaft assembly of the transmission of FIGURE 1 with the motor swash plate assembly removed;

Figure 6:
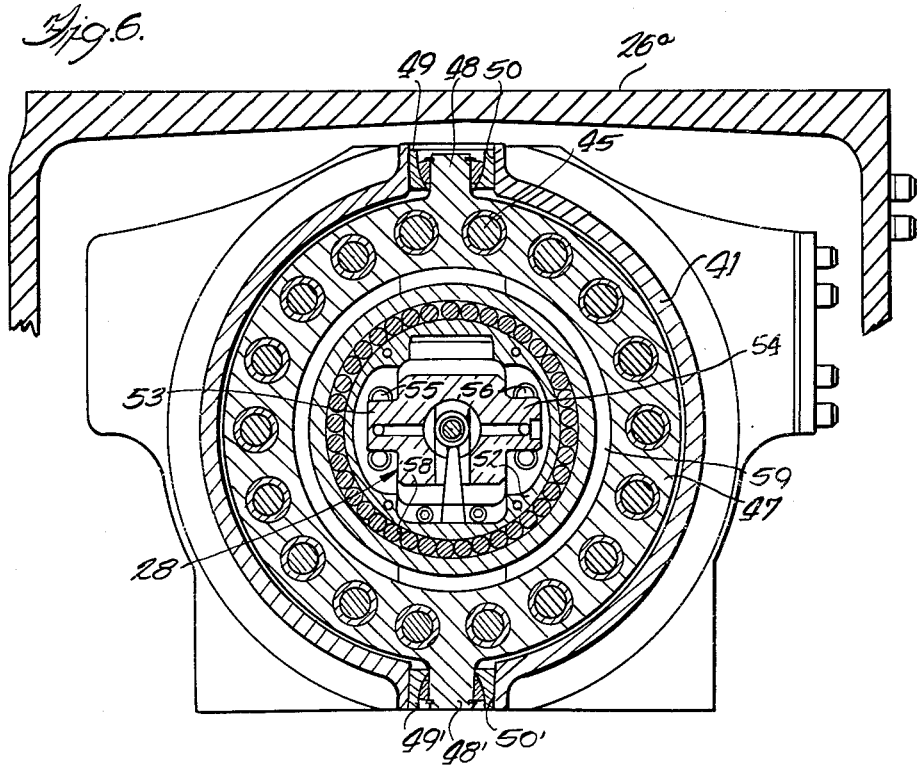
FIGURE 6 is a transverse sectional view, partly broken away, taken on line 6—6 of FIGURE 1 illustrating details of the angularly displaceable swash plate for the transmission's main or power pump.

FIGURES 12 and 12A taken compositely are a rotated longitudinal sectional view of the output shaft assembly of the transmission of FIGURE 1; FIGURE 12 illustrates the central and leftward positions of the reaction shaft and FIGURE 12A shows the rightward portion thereof;

FIGURE 13 is a transverse sectional view of the reaction shaft taken on line 13—13 of FIGURE 12 illustrating the position of the shuttle valve;

FIGURE 14 is another sectional view, partly broken away, of the output shaft assembly taken on line 14—14 of FIGURES 12 and 12A taken compositely, and illustrates details of the two high pressure auxiliary control pumps;

FIGURE 15 is still another sectional view, partly broken away, taken on line 15—15 of FIGURE 11, showing additional details of the output shaft assembly;

FIGURE 16 is another sectional view, partly broken away, taken on line 16—16 of FIGURE 13, showing check valves and fluid passages in the output or reaction shaft;

FIGURE 17 is another sectional view, partly broken away, taken in line 17—17 of FIGURE 13 showing additional fluid passage means in the reaction shaft;

FIGURE 18 is a transverse sectional view, taken on line 18—18 of FIGURE 14 illustrating further details of one of the high pressure auxiliary control pumps;

FIGURE 19 is a leftward end view of the rightward portion of the reaction shaft component, taken on line 19—19 of FIGURE 15, showing fluid passage means therein;

FIGURE 20 is a transverse view, partly in section and partly broken away, taken on line 20—20 of FIGURE 21, showing construction details of the transmission's main power pump swash plate assembly;

FIGURE 21 is a sectional view, taken on line 21—21 of FIGURE 20 illustrating further construction details of the transmission's main power pump swash plate assembly;

FIGURE 22 is a further sectional view, taken on line 22—22 of FIGURE 20, showing additional construction details of the transmission's main power pump swash plate assembly not apparent in FIGURES 20 and 21; and FIGURE 23 is a schematic diagram showing the hydraulic fluid lines in relation to the components of the transmission illustrated in the preceding figure.

With continued reference to the drawings FIGURE 1 shows a hydromechanical power transmission unit, indicated generally by the numeral 25, having preferred embodiments of the novel features of the present invention. The transmission unit 25 includes a stationary housing generally indicated at 26 and in the embodiment shown comprises a base housing 26a, end plate 26b, removable bottom plates 26c and 26d, the latter having an oil drain plug 26e.

Referring to FIGURES 1 and 1A the base housing 26a is provided with a bearing indicated generally at 27 which supports the left end of the rotatable output shaft assembly indicated at 28 and its associated gear 28'. Disposed in the end plate 26b of the housing 26 is a bearing indicated at 29, co-axial with bearing 27, which supports the input shaft indicated at 30 as best seen in FIGURE 1C.

As seen in FIGURE 1C the outer end portion of the input shaft 30 is constrained for rotation with flywheel 31 connected to a source of rotative power or prime mover such as the crankshaft 32 of a conventional internal combustion engine (not shown). The drive connection between the crankshaft 32 and the input shaft 30 of the transmission 25 is of conventional construction.

On the inner end of the input shaft 30 is a hollow splined portion 33 as seen best in FIGURE 1C. Within the hollow portion 33 is a bearing assembly indicated at 34, co-axial with bearings 27 and 29, which rotatably supports the rightward end portion of the output shaft 28. Thus it is apparent that the input shaft 30 is co-axially aligned with the output shaft 28.

Referring to FIGURE 1 it will be seen that the base housing 26a is provided with a bearing 35 coaxial with bearing 36 which rotatably supports a mechanical power take-off shaft 37. The leftward end of the shaft 37 extends through the end-wall portion of the base housing 26a and is adapted to a conventional drive connection for providing rotative power to a mechanically driven accessory such as, for example, a conventional mower. The rightward end portion of the shaft 37 is provided with a gear 38, constrained for rotation therewith, which gear 38 is in meshed relation with a pinion mounted on the portion 33 of the input shaft 30. Thus the PTO shaft 37 is in driven relation with flywheel 31 and input shaft 30. Of course it should be apparent that the PTO shaft 37 assembly is auxiliary and if desired may be omitted when the transmission 25 is employed for propelling a vehicle other than a tractor.

Referring to FIGURES 1, 1A, 1B and 1C the hydromechanical power transmission unit 25 includes a multicylinder hydraulic power motor, generally indicated at 39, and a multi-cylinder hydraulic power pump generally indicated at 40. The hydraulic power motor 39 and power pump 40 will now be described.

Referring to FIGURES 1, 1B and 1C a bell-shaped member 41 is mounted on and constrained for rotation with the input shaft 30. Rigidly connected to the bell-shaped member 41 is a power pump cylinder block 42. The pump block 42 is provided with a plurality of power pump cylinders, two of which are shown at 43 and 43' in FIGURES 1 and 1B, disposed circumferentially in equidistant relation as indicated. Each of the cylinders 43 and 43' is provided with a piston, two of which are shown at 44 and 44' and associated connecting rods 45 and 45'. The leftward end portion of each cylinder (e.g., 43 and 43') is provided with ports, two of which are indicated at 46 and 46'.

Each of the connecting rods (e.g., 45 and 45') are seated in a pump thrust ring 47 which ring is journalled for pivotal movement about two transverse stub shafts 48 and 48′ disposed in 180° axially aligned relation with respect to each other as seen in FIGURES 1, 1B and 6. The stub shafts 48 and 48′ are respectively seated in bearing blocks 49 and 49′ as shown. As seen best in FIGURES 1, 1B, 1C and 6 the bell-shaped member 41 is provided with a pair of longitudinally extending arcuately shaped grooves 50 and 50′ disposed in 180° relation. The bearing block 49 may therefore slide or move arcuately in the groove 50 in a generally longitudinal direction. Likewise the bearing block 49′ is slidable arcuately in the groove 50′ in a generally longitudinal direction. Thus the bell-shaped member 41 by means of grooves 50 and 50′ and respectively bearing blocks 49 and 49′ supports the pump thrust ring 47 but allows it to pivot about the common axis of stud shafts 48 and 48′. Further it will be evident that the thrust ring 47 pivots about a transverse axis disposed in the same plane as the axis of stub shafts 48 and 48′ but in 90° relation, the said transverse axis being fixed by arcuate grooves 50 and 50′. From the above it will become apparent that the thrust ring 47 is supported by the bell-shaped member 41 and is constrained for axial rotation therewith and, in addition, may pivot transversely in a manner similar to that of a universal joint relation. At this point it will be observed that the power pump block 42 with its associated cylinders (e.g., 43 and 43′) and connecting rods (e.g., 45 and 45′), thrust ring 47 and the bell-shaped member 41 all are constrained for rotation with the input shaft 30. The construction of the pump swash plate assembly 51 will now be described.

The pump swash plate assembly 51 includes the pump thrust ring 47 above described and also includes the pump backing plate 52. The backing plate 52 is mounted on and constrained for rotation with the output shaft 28 but is pivotally supported for angular displacement about a transverse axis. Referring to FIGURE 6 it will be seen that a portion of the output shaft 28 is of a generally square cross-section but having two stub shafts 53, 54 in transverse alignment. The backing plate 52 is mounted on the stub shafts 53, 54 in journalled relation as by bearings 55 and 56, respectively. Thus the backing plate 52 rotates with the outut shaft 28 but is tiltable about the transverse axis formed by the stub shafts 53 and 54.

Since the pump thrust ring 47 rotates with the input shaft 30 and the backing plate 52 rotates with the output shaft 28, a thrust roller bearing 57 (FIGURES 1B and 1C) and a roller bearing 58 are provided so that the thrust ring 47 and backing plate 52 are journalled for rotation with respect to each other. Thus it will be apparent from FIGURE 1 that the swash plate assembly 51 is angularly displaceable. The balancing weight 59 is secured to the output shaft 28 and is provided for the purpose of dynamically balancing the output shaft 28 and all members constrained for rotation therewith.

One means for controllably regulating the angular displacement of the swash plate assembly 51 hydraulically as well as other important features are described in my aforesaid co-pending application Serial No. 209,149 filed July 11, 1962, now Patent No. 3,157,995, and assigned to the same assignee herein. The means for controlling the angular displacement of the swash plate assembly 51 of the present embodiment will be described briefly later herein. The construction details of the motor 39 will now be described.

The hydraulic power motor 39 includes a stationary power motor cylinder block 60 secured rigidly to the housing 26 as by a plurality of circumferentially disposed bolts, two of which are shown at 61 and 62 in FIGURE 1A. The motor cylinder block 60 is provided with a plurality of power motor cylinders, two of which are shown at 63 and 63′ in FIGURE 1, disposed circumferentially in equidistant relation as evident from FIGURE 5. Each of the motor cylinders (e.g., 63 and 63′) is provided with an axially movable piston, two of which are shown at 64 and 64′ in FIGURES 1 and 1A. Each of the motor pistons (e.g., 64 and 64′) is connected to a motor thrust ring 65 by connecting rods, two of which are indicated at 66 and 66′ in FIGURES 1 and 1A.

The motor thrust ring 65 does not rotate with reference to the common axis of the input shaft 30 and output shaft 28. The means for supporting the motor thrust ring 65 will now be described.

Referring to FIGURE 1A it will be seen that the motor 39 includes a stationary bell-shaped member 67 secured in rigid relation with the housing 26a and motor cylinder 60 by means of a plurality of circumferentially spaced bolts, one of which is shown at 62. The bell-shaped member 67 is provided with oppositely disposed arcuate grooves 68 and 68′ similar to the arcuate grooves 50 and 50′ in the bell-shaped member 41 previously described. The motor thrust ring 65 is provided with transverse stub shafts 69 and 69′ in aligned relation seated respectively in bearing blocks 70 and 70′ respectively as shown in FIGURE 1A. The arcuate grooves 68 and 68′ permit the bearing blocks 70 and 70′ carrying the motor thrust ring 65 to move arcuately about a first transverse axis. Thus the motor thrust ring 65 may pivot about the aforesaid first transverse axis. In addition the motor thrust ring 65 may pivot about a second transverse axis coincidental with the axis of the stub shafts 69 and 69′. Thus the motor thrust ring 65 is non-rotative with respect to the input shaft 30 and output shaft 28 but is supported by the bell-shaped member 67 whereby the motor thrust ring 65 is movable in a manner permitted by a universal connection. From this it will be apparent that the motor thrust ring 65 is carried by the bell-shaped member 67 in the same manner that the pump thrust ring 47 is carried by the bell-shaped member 41 previously described except that the bell-shaped member 41 and its associated pump thrust ring 47 rotates with the input shaft 30 while the bell-shaped member 67 and its associated motor thrust ring are non-rotatable about the axis of the input shaft 30 and output shaft 28. The motor swash plate assembly 71 will now be described.

The motor swash plate assembly 71 includes the above described motor thrust ring 65 and a motor backing plate 72 as seen best in FIGURES 1 and 1A. The motor backing plate 72 is mounted on the output shaft 28, and constrained for rotation therewith, in the same manner as the previously described pump backing plate 52 and the details of its construction may be assumed to be the same except for symmetry. Since the motor backing plate 72 rotates with the output shaft 28 while the motor thrust ring 65 is non-rotative with respect to the output shaft 28, a thrust roller bearing 73 and a roller bearing 74 are provided for journalling between the plate 72 and ring 65 in similar relation as that of bearings 57 and 58 previously explained for the pump side. From the foregoing it will be apparent that the pump swash plate assembly 51 and motor swash plate assembly 71 are tiltable from the vertical position shown in FIGURES 1, 1A and 1C. One means for controllably regulating the angular displacement of the motor swash plate assembly 71 is described in my aforesaid copending application, now Patent No. 3,157,995. The means for controlling the angular displacement of the motor swash plate assembly 71 of the present embodiment will be described briefly later herein. The fluid power-take-off means in the present embodiment of the invention will now be described.

In line with my aforementioned copending application Serial No. 173,392 filed February 15, 1962, now Patent No. 3,151,456, the presently disclosed hydromechanical transmission is provided with fluid power-take-off means for energizing hydraulic accessories, such as a bulldozer, mower, dumping equipment, etc., as well as vehicular braking and speed retarding means. In order to accomplish such purposes employing a hydromechanical transmission as a source of power in the form of hydraulic fluid under pressure it is necessary that means be provided for communicating from the external to the high pressure and low pressure sides of the working circuit of the transmission. For purposes herein the term "working circuit" is the fluid connection between the hydraulic power pump 40 and the hydraulic power motor 39 whereby power is transmitted from one to the other.

Referring now to FIGURES 1A and 5 it will be seen that the power motor cylinder block 60 includes an annular shaped high pressure manifold 75 which leads externally of the housing 26 through a passage 75″ within the neck 75′ of the manifold 75. As shown in FIGURE 5 the cover plate 76 secured by bolts 77 is employed to seal the external connection of the high pressure manifold 75 when the transmission's fluid power-take-off is not intended to be used. Thus it will be understood that when it is desired to take advantage of the fluid power-take-off feature of the transmission 25 the cover plates 76 and 76′ are removed and a suitable high pressure conduit is connected directly to the neck 75′ of the high pressure manifold 75.

Referring now to FIGURE 1B it will be seen that an annular shaped low pressure manifold 78 is secured rigidly to the motor cylinder block 60 by a plurality of bolts one of which is shown at 79. The manifold 78 is provided with a generally cylindrical shaped passage 80. The fluid passage 80 of the low pressure manifold 78 communicates with a passage (not shown) in the neck 78′ (FIGURE 5) which in turn may be communicatively connected to a suitable external conduit (not shown) by removal of the cover plate 81 and its securing bolts 82 in the same manner as that described for the high pressure manifold 75. The means for communicating the high pressure manifold 75 and the cylindrical passage 80 of the low pressure manifold to the working circuit of the transmission will now be described.

Referring to FIGURES 1A and 1B it will be seen that the motor cylinder block 60 is provided with a series of small bores 83 circumferentially disposed in equidistant relation, one for each of the motor cylinders (e.g., 63, 63′). Each of the bores 83 communicates with the passage 80 of the low pressure manifold 78. Each of the bores 83 communicates with an axially extending large bore 84 which in turn extends to communicate with the high pressure manifold 75. Disposed in each of the large bores 84 is a pair of check valves 85, 86 in substantially front-to-back relation. The inlet side of each check valve 85 communicates with its associated small bore 83 and passage 80 of the low pressure manifold 78. The outlet side of the check valve 85 and the inlet side of check valve 86 are in communication with their associated motor cylinder (e.g., 63) by radial bores, one of which is shown at 87, connecting cylinder 63 with its associated large bore 84. The outlet sides of each of the check valves 86 communicate with the high pressure manifold 75. From this it will be apparent that when the motor cylinder 63 is at low pressure hydraulic fluid may be admitted therein by opening of the inlet check valve 85 thus permitting fluid from passage 80 of the low pressure manifold 78 to enter the motor cylinder (e.g., 63). Now when the motor cylinder (e.g., 63) is at high pressure the inlet check valve 85 will be closed. If fluid power-take-off is being utilized the outlet check valve 86 opens which permits fluid from the motor cylinder (e.g., 63) to flow into the high pressure manifold 75. If the fluid power-take-off is not being utilized then of course the outlet check valve 86 will not open because of hydraulic lock and thus all hydraulic pressure in the motor cylinder (e.g., 63) is utilized in transmitting power to the output shaft 28. In summary it should be remembered that for each motor cylinder (e.g., 63 and 63′) of the motor 39 there is provided one small bore 83, one large bore 84, one inlet check valve 85, one outlet check valve 86, and one radial bore 87 all in relation as shown. Thus each pair of check valves 85, 86 function only for its associated motor cylinder. It should also be mentioned at this point that the pressure available for fluid power-take-off is a function of the resistance to rotation of the output shaft 28. Therefore if it is desired to employ the transmission 25 as a source of fluid under pressure under maximum fluid power-take-off condition it is necessary to constrain the output shaft 28 against rotation which can be accomplished by a suitable brake on the vehicle such as an emergency brake (not shown). The construction of the output shaft 28 and its associated components rotating therewith will now be described.

Referring to FIGURES 12 and 12A the output shaft 28 for manufacturing reasons includes three basic sections or bodies 28a, 28b and 28c secured rigidly together by four long bolts 88, 89, 90 and 91 as indicated in FIGURES 5, 11, 15 and 19. Section 28a houses the hydraulic control mechanism for controlling the angular displacement for the motor swash plate 71, and section 28b houses the hydraulic control mechanism for controlling the angular displacement of the pump swash plate 51. The central section 28c is the rotatable valve plate which valves the fluid between the power pump 40 and the power motor 39 through arcuate slots, commonly referred to as "kidney valves" 92 and 93 seen in FIGURE 11. As indicated in FIGURES 11 and 15 the kidney valve 92 is formed by arcuate grooves 94 and 95 communicatively connected together by a plurality of holes 96. Likewise kidney valve 93 is formed by arcuate grooves 94′ and 95′ communicatively connected together by a plurality of holes 96′ in the rotatable valve plate 28c. The purpose of the holes 96 and 96′ is that the structural material between adjacent holes provides reinforcement so that high fluid pressure does not cause radial deformation of the contour of the kidney valve. The function of the kidney valves 92 and 93 for communicating high pressure fluid and low pressure fluid between the hydraulic power pump 40 and the hydraulic power motor 39 is well known in the art and will not be discussed in detail here. It is sufficient to say that during operation of the transmission 25 for transmitting power from the input shaft 30 to the output shaft 28 one of the kidney valves 92 or 93 will be at high pressure and the other at low pressure. The hydraulic control mechanism for controlling the angular displacement of the pump and motor swash plates 51 and 71 will now be described.

The hydraulic control mechanism shown in the drawings herein is basically the same as that shown and described in my aforementioned copending application Serial No. 209,149 filed July 11, 1962, now Patent No. 3,157,995, except for one important difference, namely the means for a source of supply of fluid under pressure to energize the hydraulic control mechanism. In the aforesaid copending application the source of fluid under pressure for energizing the hydraulic control mechanism was derived from the high pressure side of the working circuit, i.e., the kidney valve on the high pressure side. While this is satisfactory for most operating conditions of the transmission there are nevertheless, as previously mentioned, some operating conditions wherein the pressure differential in the working circuit is nil or too low to operate the hydraulic control mechanism. In such instances the angular displacement control of the two swash plates is temporarily lost. The present invention provides means for supplying the hydraulic control mechanism with a source of high pressure fluid, independently of the working circuit, which is available under all conceivable operating conditions of the transmission. For orientating purposes a brief discussion will be made of the hydraulic control mechanism followed by a full description of the high fluid pressure for energizing same according to this invention.

In FIGURE 1 it will be seen that the output shaft 28 on the pump side is provided with a pair of hydraulic control cylinders or rams 97, 98 disposed axially but in 180° relation. The piston 99 is in operative relation with the pump backing plate 52 through connecting rod 100. Likewise the piston 101 is in operative relation with the pump backing plate 52 through connecting rod 102. Thus it is apparent that by suitable control of the fluid pressure in the rams 97 and 98 the angular displacement of the pump swash plate 51 can be selectively determined. Likewise the motor side is provided with a pair of hydraulic cylinders or rams 103 and 104 disposed axially in 180° relation. The piston 105 is operatively connected to the motor backing plate 72 through connecting rod 106 and piston 107 is operatively connected to the motor backing plate 72 through connecting rod 108. Thus it is also apparent that by suitable control of the fluid pressure in rams 103 and 104 the angular displacement of the motor swash plate 71 can be selectively determined. It should be noted that the ram 97 is separated from the ram 103 by a press-fit plug 109 disposed in the rotatable valve plate 28c (FIGURE 12). Likewise the ram 98 is separated from the ram 104 by a press-fit plug 110 disposed in the rotatable valve plate 28c.

Referring now to FIGURES 12 and 12A it will be seen that the output shaft 28 is provided with a pump swash plate control valve with follow-up means, indicated generally at 111 which controls the hydraulic rams 97 and 98 for controlling the angular displacement of the pump swash plate 51. Likewise the output shaft 28 is also provided with a motor swash plate control valve with follow-up means, indicated generally at 112. The construction of the control valves 111 and 112 are similar and therefore only the pump control valve 111 will be described and corresponding elements of the control valve 112 for the motor 39 will bear the same designation numerals except they will be primed where applicable.

Disposed within the output shaft 28 in press-fit relation is a bushing 113 with five transverse ports 114, 115, 116, 117 and 118. Port 114 is a drain port and drains through groove 119 (FIGURE 12), radial passages 120 and 121 (FIGURE 14) and to the sump 122 (FIGURE 1) through roller bearings 123, 124. Port 118 also is a drain port and drains through groove 125 leading to sump 122 through radial passages 126 and 127 (FIGURE 14). Port 115 leads to the pump displacement control ram 98 through passage 128 (FIGURES 1B, 12 and 12A), and port 117 leads to the pump displacement control ram 97 through passages 129 and 130. On the motor side port 115′ leads to motor displacement control ram 104 through passages 131 and 132 and port 117′ leads to the motor displacement control ram 103 through passages 133 and 134. Ports 116 and 116′ are fluid pressure inlet ports to the swash plate control valves 111 and 112 respectively for energizing control rams 97, 98, 103 and 104. The source of fluid pressure leading to the ports 116 and 116′ is of prime importance in the present invention and will be discussed later herein in detail. For the present it may be assumed that fluid under pressure is always available at the ports 116 and 116′.

Disposed in slidable relation within the bushing 113 is a valve sleeve 140 having transverse ports 135, 136, 137, 138 and 139 in registerable relation with ports 114, 115, 116, 117 and 118 respectively. As viewed in FIGURE 12A the rightward end of the valve sleeve 140 is connected to a tubular element 141 the latter being slidably supported by a bearing bushing 142. Disposed on the rightward end portion of the tubular element 141 is an annular groove 143. Adjacent the annular groove 143 it will be seen that the output shaft 28 is provided with a longitudinally extending slot 144. Referring now to FIGURE 1B it will be seen that the inner portion of the swash plate 51 is provided with a projection or finger 145 having a ball 146 on the inner end thereof in engaging relation with the annular groove 143 of the tubular element 141. From this it will be apparent that the axial position or movement of the valve sleeve 140 is a function of the angular displacement of the swash plate 51 and it will be seen later that the valve sleeve 140 functions as a follow-up means for maintaining the angular displacement of the swash plate at a selected position.

Returning to FIGURES 12 and 12A it will be seen that slidably disposed in the sleeve valve 140 is a spool valve generally indicated at 147. The spool valve 147 is provided with lands 148, 149 and 150 with circumferential grooves 151 and 152 therebetween as shown. The spool valve 147 includes a rod portion 153 slidably extending through the tubular element 141 forming a connecting rod or work member of a hydraulic cylinder indicated at 154. The rightward end of the rod 153 is connected to a piston 155 slidably disposed in bore 156 of casing 157. The casing 157 is adjustably secured in rigid axial relation with axial bore 158 in the output shaft 28. A compression spring 159 is positioned to urge the piston 155, rod 153, and spool valve 147 in a rightward direction as viewed in FIGURE 12A. From this it will be apparent that the position of the spool valve 147 is a direct function of the fluid pressure in chamber 160 of the hydraulic cylinder 154. The signal fluid pressure to the chamber 160 may be controlled conventionally by a source of pump signal fluid pressure external of the transmission 25 and the fluid passages leading to the chamber 160 will now be described.

In FIGURE 1C it will be seen that in the end plate 26b of the housing 26 there is a fluid passage 161 the upper end of which leads to an external port 161a (FIGURE 9) in the end plate 26b and is communicatively connected to a conventional source of fluid under pressure which pressure may be selectively controlled by conventionally known means hereinafter referred to as the pump displacement signal control pressure. The pump displacement signal control pressure enters passage 161 to port 162. Disposed in the input shaft 30 is a circumferential groove 163 in continuous registry with the port 162. The input shaft 30 is provided with transverse or radial ports 164 communicating with the annular groove 163. The ports 164 extend inwardly through a bearing element 165 in the input shaft 30 in press-fit relation.

Referring now to FIGURE 22 it will be seen that the casing 157 of the hydraulic cylinder 154 is provided with a projection 166 having at least one longitudinal groove or passage 167, the rightward end thereof being in communication with circumferential groove 168 through transverse passage 169. The other end of the longitudinal groove 167 communicates with chamber 160 of the hydraulic cylinder 154. Thus it is apparent that the external source of the pump displacement signal control pressure enters passage 161 to port 162; thence to the annular groove 163 and ports 164 in the input shaft 30; thence to the annular groove 168, transverse passage 169 and longitudinal groove 167 in projection 166 of the casing 157 to the chamber 160 in hydraulic cylinder 154. The pump displacement signal control pressure in passage 161 and chamber 160 acts hydraulically on the piston 155 to urge the rod 153 and its associated spool valve 147 in a leftward direction. An increase in signal pressure in chamber 160 moves piston 155 leftwardly against the compression force of spring 159. Conversely a lowering of the signal pressure in chamber 160 allows the compressive force of the spring 159 to move the piston 155 rightwardly until the force of spring 159 equals the hydraulic force on the piston 155 due to the signal pressure in chamber 160. From this it will be seen that the axial position of the spool valve 147 is a direct function of the pump displacement signal control pressure imposed in passage 161. The operation of the pump swash plate control valve 111 will now be described from which it will be apparent that the angular displacement of the pump swash plate 51 is a direct function of the pump displacement signal control pressure in passage 161.

Referring to FIGURES 1B, 12 and 12A the pump swash plate control valve 111 is shown in the position when the pump swash plate 51 is vertical or zero pump displacement position. In this condition the hydraulic pressure inlet port 116 is blocked by registry with land 149 of spool valve 147 as shown. Port 138 communicatively connected to control ram 97 is in communication with circumferential groove 151 of the spool valve 147 but the groove 151 is not in communication with any other port. Therefore control ram 97 is hydraulically locked. Likewise port 136 communicatively connected to control ram 98 communicates with circumferential groove 152 of the spool valve 147 but the groove 152 is not in communication with another port. Therefore control ram 98 is also hydraulically locked. From this it is apparent that the pump swash plate 51 is held under hydraulic lock in the vertical position shown.

Assuming now that the pump displacement signal control pressure is increased in passage 161 to a higher value which correspondingly increases the pressure in chamber 160 of hydraulic cylinder 154, the piston 155 will move the rod 153 and the spool valve 147 leftwardly to a new position determined by the signal pressure in chamber 161. Leftward movement of the spool valve 147 moves land 149 out of registry with the pressure inlet port 137 and communicates hydraulic pressure to circumferential groove 151. Since port 138 is always in communication with the groove 151 fluid under pressure is admitted to control ram 97 thus energizing it in a direction to rotate the pump swash plate 51 in a clockwise direction. At the same time the land 148 of the spool valve 147 moves out of registry with port 135 and thereby communicates port 135 leading to drain with circumferential groove 152. Since the groove 152 is always in communication with port 115 communicatively connected to control ram 98, the control ram 98 may exhaust. Now as the energized ram 97 moves the swash plate 51 in a clockwise direction the finger 145 (FIGURE 1B) attached to the swash plate 51 moves the tubular element 141 leftwardly by engagement of ball 146 in the annular groove 143. The leftward movement of the tubular element 141 also moves the valve sleeve 140 correspondingly until the inlet fluid pressure port 137 is again in registry with land 149 of the spool valve 147. When port 137 again registers with land 149 fluid pressure from pressure inlet port 116 to control ram 97 is terminated. Likewise port 135 again registers with land 148 thereby terminating drain communication with control ram 98. Thus hydraulic lock of control rams 97 and 98 is re-established. It will also be apparent that any fluid leakage in the hydraulic lock of control rams 97 and 98 resulting in a change in position of the swash plate 51 will move the valve sleeve 140 which will function to energize one of the rams 97 or 98 in a corrective direction. Thus a follow-up means for maintaining the angular displacement of the swash plate 51 in coordinated relation with respect to the selected position of the spool valve 147 is shown.

The motor swash plate control valve 112 functions to control the operation of the motor control rams 103 and 104 for controlling the angular displacement of the motor swash plate 71 in the same manner as that described above for the pump swash plate control valve 111, pump control rams 97, 98 and therefore will not be further described. However it should be mentioned that the motor displacement control signal pressure in passage 161' communicates with chamber 160' of hydraulic cylinder 154' in a slightly different manner than that described above for the pump. The passage 161' communicates with an annular groove 170 in the base housing 26a as seen in FIGURE 1A. In continuous registry with annular groove 170 is a plurality of transverse or radial bores, two of which are shown at 171 in FIGURE 1A, disposed in the hub portion of gear 28' splined at 172 to the output shaft 28. The ports 171 in turn communicate with transverse ports 173 in the output shaft 28 as shown. Referring now to FIGURE 12 the ports 173 communicate with transverse ports 174 through annular groove 174a disposed in the leftward end portion of casing 157' of hydraulic cylinder 154'. The transverse ports 174 in turn communicate with chamber 160' through axial passage 175. Thus it is apparent that the signal pressure in passage 161' of housing 26a communicates continuously with and corresponds to the pressure in chamber 160'. It should be mentioned at this time that the pump displacement control signal pressure delivered to passage 161 may be controlled externally by conventional means and likewise the motor displacement control signal pressure delivered to passage 161' may be controlled externally by a second conventional means. Thus the angular displacement of the pump swash plate 51 may be independently controlled with respect to the control of the angular displacement of the motor swash plate 71.

We come now to an extremely important feature of the present invention, namely, self-contained means for supplying hydraulic fluid under pressure to the ports 116 and 116' of the pump swash plate displacement control valve 111 and the motor swash plate displacement control valve 112, respectively, under all operating conditions of the hydro-mechanical transmission 25. The source of such hydraulic pressure to ports 116 and 116' should be of a volumetric capacity carefully chosen so that the rate of movement of control rams 97, 98, 103 and 104, when energized as previously explained, is not too slow for in such instance the control of angular displacement during a change of speed ratio reacts sluggishly in response to selected signal pressure changes by the operator. On the other hand if the source of hydraulic pressure to the ports 116 and 116' is of excessive volumetric capacity then the efficiency of the transmission 25 is correspondingly reduced for the unused hydraulic fluid pressure must be disposed of through relief valve means. Furthermore the source of fluid pressure supplied to the ports 116 and 116' must be of sufficient high pressure magnitude so that operation of the control rams 97, 98, 103 and 104 can be assured under all operating conditions of the transmission 25. As will be seen later herein the source of fluid pressure to ports 116 and 116' is entirely independent of the high pressure side of the fluid working circuit (i.e., the fluid pressure in one of the arcuate slots 92, 93 (FIGURE 11) in section 28c of the output shaft 28). The means for providing a source of hydraulic fluid at high pressure to the ports 116 and 116' will now be described.

Referring now to FIGURES 14 and 18 it will be seen that the motor section 28a of the output shaft 28 is provided with a first control pump generally indicated at 176. The control pump 176 includes a cylinder member 177 positioned in press-fit relation in a transverse bore 178 in the motor section 28a of the output shaft 28. Slidably disposed in the cylinder member 177 is a reciprocable piston 179 the lower end thereof being in communication with a control pump chamber 180. The upper end of the piston 179 is spherically shaped in seating relation with an actuator or shoe 181. From FIGURES 5 and 7 it will be apparent that the upper spherically shaped portion of the piston 179 is secured to the shoe 181 in pivotal relation by conventional means such as a snap ring 182. As will be noted from FIGURES 5, 7, 14 and 18 the longitudinal axis of piston 179 is perpendicular to the axis of rotation of the output shaft 28. A compression spring 183 is disposed between the underside of the shoe 181 and the cylinder member 177 which urges the shoe 181 and its connected piston 179 in an outwardly direction as shown. Thus it will be apparent that reciprocation of the shoe 181 correspondingly reciprocates the piston 179. Means for reciprocating the shoe 181 and its associated piston 179 will now be described.

Referring to FIGURES 1 and 1A it will be seen that between the stationary power motor cylinder block 60 and section 28a of the output shaft 28 roller bearings 184 and 185 are disposed in axial spaced relation. Between the bearings 184 and 185 and secured to the cylinder block 60 in press-fit relation is an eccentric ring or cam 186. From FIGURE 5 it will be seen that the cam ring 186 has an outer periphery 186a circular in shape and an inner periphery 186b also circular in shape. However, the outer periphery 186a of the cam ring 186 is positioned concentric with respect to the rotational axis of the output shaft 28 but the inner periphery 186b is off-center or eccentric with respect to the rotational axis of the output shaft 28. The shoe 181 of the first control pump 176 is abuttingly held in contact with the inner periphery 186b by the urging of compression spring 183. Hence it will be apparent that for each revolution of the output shaft 28 the piston 179 of the first control pump 176 will complete one cycle of operation including both intake stroke and pump stroke.

A second control pump 187 on the sump side is constructed in the same manner as that of the first control pump 176 which is evident from FIGURE 14 except that the eccentric cam ring 188 (FIGURES 1 and 1B), corresponding to cam ring 186, is secure in press-fit relation to the power pump cylinder block 42 between the axially spaced roller bearings 123 and 124 as shown. Since the power pump cylinder block 42 rotates with the input shaft 30 it will be apparent that the second control pump 187 completes one cycle of operation when the output shaft 28 makes one revolution relative to the input shaft 30. From this it will be seen that when the transmission 25 is in direct drive (i.e., the speed of the output shaft 28 equals the speed of the input shaft 30 in the same direction) the second control pump 187 does not cycle and thus does not pump as there is no relative rotation between the output shaft 28 and the input shaft 30. However, under such condition the first control pump 176 will cycle because the output shaft 28 is rotating relative to the stationary cam ring 186. On the other hand if the transmission 25 is in neutral wherein the output shaft 28 is at rest then the first control pump 176 will not cycle while the second control pump 187 cycles due to the rotation of the input shaft 30 relative to the at rest output shaft 28. Under all other conditions of operation both control pumps 176 and 187 will cycle but not necessarily at the same rate with respect to each other. Both of the control pumps 176 and 187 have their respective discharge sides connected in parallel relation and communicatively connected to the ports 116 and 116' of the pump and motor swash plate control valves 111 and 112 as will now be described.

Referring to FIGURE 14 it will be seen from the similar construction of the first and second control pumps 176, 187, that the second control pump 187 is provided with a control pump chamber 189 similar to the control pump chamber 180 of the first control pump 176. Now from FIGURE 18 it will be seen that control pump 176 discharges hydraulic fluid at high pressure into longitudinal passage 190 through a check valve indicated at 191. Referring now to FIGURE 16 it will be seen that control pump chamber 189 also discharges hydraulic fluid into longitudinal passage 190 through check valve indicated at 192. Thus it will be apparent that when the control pumps 176 and 187 are in pumping stroke, the hydraulic fluid pumped at high pressure from either or both is delivered to the longitudinal passage 190. Now the longitudinal passage 190 communicates with another longitudinal passage 193 through a connecting passage 194 as shown in FIGURE 19. Now from FIGURE 17 it will be seen that hydraulic fluid at high pressure from control pumps 176, 187 communicatively connected to longitudinal passage 193, as described, is also in communication with annular grooves 195 and 196 in bushings 113' and 113, respectively, of the motor swash plate control valve 112 and pump swash plate control valve 111, respectively. As will be evident from FIGURES 12 and 12A the annular groove 195 communicates with port 116' and annular groove 196 communicates with port 116. Thus from the above it has been shown that hydraulic fluid at high pressure discharged from control pumps 176 and 187 is combined in longitudinal passage 193 which passage is in communication with fluid pressure inlet ports 116 and 116' of swash plate control valves 111 and 112. Hence it is clear that the motor displacement control rams 103, 104 and the pump displacement control rams 97, 98 are energized by hydraulic fluid pressure delivered by either or both the first and second control pumps 176 and 187.

From the foregoing it will be apparent that when both of the swash plate control valves 111, 112 are in neutral position (i.e., control rams 97, 98, 103, 104 in hydraulic locked condition) there is no fluid flow in longitudinal passage 193 or pressure ports 116 and 116'. In such condition means must be provided for discharging fluid pumped by the control pumps 176 and 187 as otherwise they would be under hydraulic lock. Referring to FIGURE 14 it will be seen that control pump chamber 180 of control pump 176 communicates with the inlet side of a high pressure relief valve indicated at 197 the discharge side thereof communicating with radial passage 120' draining to the sump 122. Likewise control pump chamber 189 of control pump 187 communicates with the inlet side of another high pressure relief valve indicated at 198 the discharge side thereof communicating with radial passage 120 draining to the sump 122. Thus the high pressure relief valves 197, 198 prevent excessive high pressure in control pump chambers 180 and 189, respectively, thereby preventing hydraulic lock of control pumps 176 and 187. In short, the relief valves 197, 198 limits the maximum fluid pressure available to energize swash plate control rams 97, 98, 103 and 104. Means will now be described for furnishing inlet hydraulic fluid to both control pumps 176 and 187.

Hydromechanical power transmissions conventionally are provided with a low pressure charge pump which serves the primary purpose of replacing hydraulic fluid lost through leakage in the working circuit and secondarily to lubricate under pressure the various bearings in the transmission. In the present disclosure a conventional charge pump indicated at 200 in FIGURES 1 and 1C is mounted on the stationary end plate 26b of housing 26 and is operatively connected in driven relation with the input shaft 30 as shown. The charge pump 200 draws hydraulic fluid from the sump 122 through a conventional strainer 201 and connecting pipe 202 shown partly in FIGURE 1 and shown schematically in FIGURE 23. The discharge side (e.g., 100 p.s.i.) of the charge pump 200 (FIGURE 23) is connected to the inlet side of oil filter 203 through pipe 204. The outlet side of the filter 203 connects with the inlet side of an oil transfer manifold 205 through pipe 206. Now the oil transfer manifold 205 is a conventional means for routing part or all of the hydraulic fluid through an oil cooler or heat exchanger (not shown) and part of the fluid is piped to lubricate bearings, for example, bearings 27, 29, 35 and 36. The outlet side of the oil transfer manifold 205 is communicatively connected to the stationary low pressure manifold 78 of the transmission 25 through connecting conduit 207. From the low pressure manifold 78 fluid at low pressure enters the working circuit through radial bores 87 and check valves 85 when make-up fluid is required in the working circuit. From this it is apparent that the charge pump 200 provides low pressure fluid to the low pressure side of the working circuit to replace not only loss by leakage but also, as will be shown, inlet fluid to the control pumps 176 and 187.

Inlet fluid to the control pumps 176 and 187 is always taken from the low pressure side of the working circuit and in the present embodiment illustrated the inlet fluid is taken at the arcuate slots or kidney valves 92, 93 whichever is at low pressure. Referring to FIGURE 14 it will be seen that section 28c of the output shaft 28 is provided with a diametrically disposed bore 208 extending there-through. Disposed within the bore 208 in press-fit relation is an elongated bushing 209 threaded internally at each end thereof as shown. The bushing 209 is provided with four annular groves 210, 211, 212 and 213 on the outer surface thereof as indicated. The annular groove 210 communicates with arcuate slot 92 through at least one of the longitudinal holes 96. Likewise annual groove 213 communicates with arcuate slot 93 through at least one of the longitudinal holes 96' as indicated.

The bushing 209 at its upper end portion is provided with a plurality of lateral ports 214 extending inwardly thereby communicatively the annular groove 210 with the inner bore 215 of bushing 209 as shown. Likewise the bushing 209 at its lower end portion is provided with a plurality of lateral ports 216 extending inwardly for communicating the annular groove 213 with the inner bore 215 of bushing 209. Thus it is apparent that both arcuate slots 92 and 93 communicate with the inner bore 215 of the bushing 209.

Disposed in secured relation to the bushing 209 is a pair of rings 217 and 218 in vertically spaced relation as shown in FIGURE 14. Positioned above the ring 217 is a hollow filter element 219 having a circumferential groove 220 on the outer side thereof which groove 220 communicates with the ports 214. Thus as hydraulic fluid in the circumferential groove 220 from ports 214 passes laterally through the filter element 219 the strained fluid enters the hollow portion 221 and moves downwardly through the ring 217 into an upper chamber 222 of a shuttle valve generally indicated at 223. Likewise below the ring 218 is another hollow filter element 224 constructed similar to filter element 219 so that hydraulic fluid from ports 216 enters a lower chamber 225 of the shuttle valve 223. Thus hydraulic fluid from the kidney valve 92 is communicatively connected to the upper chamber 222 of the shuttle valve 223 and hydraulic fluid from the other kidney valve 93 is communicatively connected to the lower chamber 225 of the shuttle valve 223 at all times.

Disposed in the bushing 209 between the rings 217 and 218 is a slidable valve plunger 226 which is of tubular construction except for a pistol portion 227. The lower portion of the slidable plunger 226 extends into the lower chamber 225 and the upper portion of the plunger 226 extends into the upper chamber 222. Thus it will be apparent that fluid pressure in the kidney valve 92 hydraulically acts on the upper surface of piston 227 thereby urging the valve plunger 226 downwardly while the fluid pressure in kidney valve 93 hydraulically acts on the lower side of piston 227 thereby urging the slidable valve plunger upwardly. From this it will be appreciated that when the fluid pressure of the working circuit in kidney valve 92 is at high pressure the slidable valve plunger 226 will assume the position illustrated in FIGURE 14. On the other hand if the fluid pressure in kidney valve 93 is at high pressure the slidable valve plunger 226 will be moved upwardly to about the lower side of the ring 217. At this point it should be remembered that during normal operation of the transmission 25 there will be a differential pressure between the kidney valves 92 and 93 and thus the position of the slidable valve plunger 226 will be in accordance therewith. A light compression spring 228 in the chamber 222 abutting the lower side of the ring 217 and the upper side of the piston 227 is employed to prevent the valve plunger 226 from assuming an intermediate position when, for example, the transmission 25 is at rest (i.e., input shaft 30 and output shaft 28 are at rest).

As seen in FIGURE 14 the elongated bushing 209 is provided with two sets of lateral discharge ports 229 and 230. The discharge ports 229 communicate with annular groove 211 and the discharge ports 230 communicate with annular groove 212 as shown. The valve plunger 226 is provided with a pair of lands 231 and 232 in vertical spaced relation. The land 231 is registerable with discharge ports 229 and the land 232 is registerable with discharge ports 230. When the land 231 is not in registry with discharge ports 229 the annular groove 211 is in communication with upper chamber 222 through discharge ports 229 and thus the annular groove 211 is in fluid communication with kidney valve 92. When the land 232 is not in registry with discharge ports 230 the annular groove 212 is in communication with lower chamber 225 and thus the annular groove 212 is in communication with kidney valve 93. However from FIGURE 14 is will be apparent that either the land 231 is in registry with discharge ports 229 or the land 232 is in registry with discharge ports 230. Therefore if the fluid pressure in the kidney valve 92 is lower than that in the kidney valve 93, the valve plunger 226 shifts to the upper position and the fluid pressure in the kidney valve 92 is in communication with the annular groove 211 while the higher pressure in kidney valve 93 does not communicate with annular groove 212 because the land 232 of the valve plunger 226 is in registry with discharge ports 230. On the other hand if the fluid pressure in the kidney valve 93 is lower than that in the kidney valve 92, the valve plunger 226 shifts to the lower position, as shown in FIGURE 14, and the fluid pressure in the kidney valve 93 is in communication with the annular groove 212 while the higher pressure in kindney valve 92 does not communicate with annular groove 211 because the land 231 of the valve plunger 226 is in registry with discharge ports 229. It will thus be apparent from the above that one of the annular grooves 211 or 212 is always in fluid communication with the low pressure side of the working circuit in the transmission 25. Now the annular grooves 211 and 212 are in fluid communication with each other so that the fluid pressure in both of the grooves 211 and 212 will be the same. The means for interconnecting the annular grooves 211 and 212 communicatively together will now be described.

Referring to FIGURE 13 it will be seen the annular groove 211 associated with the shuttle valve 223 communicates with a longitudinally extending passage 233 through a lateral passage 234. Similarly the annular groove 212 communicates with another longitudinally extending passage 235 through a lateral passage 236. The longitudinal passage 235 leads to roller bearings 123, 124, 184 and 185 (FIGURE 1) for forced lubrication thereof. However as shown in FIGURE 17 the passage 235 is provided with restrictive orifices 237 and 238 so that the fluid pressure on the low pressure side of the kidney valves 92 and 93 of the working circuit is not significantly reduced below that delivered to the low pressure side of the working circuit by the charge pump 200. Referring to FIGURES 13 and 16 it will be seen that the longitudinal passage 233 leads to the control pump chamber 180 of the first control pump 176 (i.e., motor side) through inlet check valve indicated at 239. Likewise the longitudinal passage 233 leads to the control pump chamber 189 of the second control pump 187 (i.e., pump side) through inlet check valve 240.

Referring now to FIGURE 19 it will be seen that longitudinal passages 233 and 235 are communicatively connected together through lateral passage 241. From this it will be apparent that both annular grooves 211 and 212 associated with the shuttle valve 223 of FIGURES 13, 14 and 16 are in communication with the control pump chambers 180 and 189 through respective inlet check valves 239 and 240. Thus it has been shown that the hydraulic fluid inlet to the control pumps 176 and 187 is taken from the working circuit of the transmission 25 through the kidney valves 92 or 93 whichever is at the low pressure. Since the charge pump 200 delivers hydraulic fluid to the low pressure side of the working circuit as previously explained, it becomes immediately apparent that the control pumps 176 and 187 are always provided inlet hydraulic fluid at substantially the same pressure delivered by the charge pump 200 (e.g., 100 p.s.i.).

At this point it should be appreciated that the slidable valve plunger 226 of the shuttle valve 223 will shift during operation of the transmission 25 from one position to its alternate position. For example when a vehicle is propelled upward on a hill by the engine driving the input shaft 30, the hydraulic power pump 40 will function as a pump and the hydraulic power motor 39 will function as a motor and the valve plunger 226 will assume one position. But after the vehicle passes the top of such hill and moves downwardly, the vehicle then drives the hydraulic motor 39 which then functions as a pump driving the pump 40 as a motor. Thus the pressure differential between the kidney valves 92 and 93 reverses which results in shifting the valve plunger 226 of the shuttle valve 223 to its alternate position. Therefore irrespective of the operating conditions of the transmission 25, the control pumps 176 and 187 receive inlet hydraulic fluid always from the low pressure side of the transmission's working circuit.

From the foregoing it will now be apparent that irrespective of the operating conditions of the transmission 25, high fluid pressure from the control pumps 176 and 187 is always available at ports 116 and 116' (FIGURES 12 and 12A) of the pump and motor swash plate control valves 111 and 112 so that the operator may at all times energize effectively at high pressure the hydraulic control cylinders 97, 98, 103 and 104 for controlling the angular displacement of the pump swash plate 51 and motor swash plate 71 simultaneously or independent of each other as previously explained.

Forced lubrication for the bearings 123, 124, 184 and 185 has been previously described. The bearings 55, 56, 57 and 58 of the pump swash plate assembly are also lubricated under pressure from the charge pump 200 in the following manner. In FIGURE 10 hydraulic fluid from the charge pump 200 enters the passage 242 through conduit 243 and proceeds upwardly to port 244 as shown. Now referring to FIGURE 1C it will be seen that port 244 is in registry with an annular groove 245 disposed in the input shaft 30. Radial passages 246 in the input shaft 30 communicate with the annular groove 245 with a small chamber 247 which chamber receives the extreme rightward end portion or projection 166 of the output shaft 28. Referring to FIGURE 22 the projection 166 of the output shaft 28 is provided with at least one longitudinal passage 248 which extends along the casing 157 of the hydraulic cylinder 154 as indicated. The passage 248 communicates with a circumferential groove 249 which is in registry with radial passages 250 in the output shaft 28 as shown. The radial passages 250 communicate with an arcuate groove 251 as indicated in FIGURES 21 and 22. From the arcuate groove 251 the lubricating fluid is conducted to bearings 57 and 58 through combined passage 252 as seen best in FIGURE 21. Also to lubricate the bearings 55 and 56 on stub shafts 53 and 54 there is provided a transverse passage 253 leading from the arcuate groove 251 as seen in FIGURE 21. From this it can be seen that the bearings associated with the pump swash plate 51 are all lubricated under pressure from the charge pump 200.

The bearings associated with the motor swash plate 71 are lubricated much in the same manner as that above described for the bearings associated with the pump swash plate 51. Lubricating fluid from the charge pump 200 enters through the conduit 254 as shown in FIGURE 1A and is conducted through the output shaft 28 to the bearings in the motor swash plate 71 generally in the same way above described and thus a further description thereof is deemed unnecessary.

Figure 8:
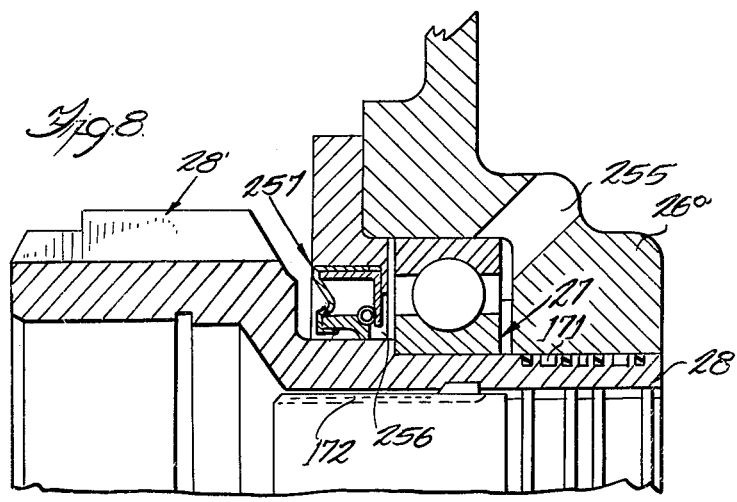
FIGURE 8 is a sectional view, partly broken away, taken on the line 8—8 of FIGURE 3 showing fluid passage means for bearing lubrication of the transmission of FIGURE 1.

Referring to FIGURES 1A and 8 the bearing 27 is lubricated by hydraulic fluid through conduit 255. Hydraulic fluid from passage 255 passes through the bearing 27 into annular groove 256 along bearing seal 257. The annular groove 256 communicates with a fluid passage 258 in the base housing 26a as seen in FIGURE 1A. The fluid passage 258 leads to the bearing 35 supporting the power-take-off shaft 37 for lubrication thereof. After the hydraulic fluid passes through the bearing 35 it is discharged to the sump or reservoir 122 through passage 259 as shown in FIGURE 1A. The bearings 29 and 36 disposed at the rightward end portion of FIGURE 1 are lubricated similar to that just described for the bearings 27 and 35 and thus will not be described further herein.

The speed ratio characteristics of the hydro-mechanical power transmission 25 between the input shaft 30 and the output shaft 28 as related to the angular displacements of the pump swash plate 51 and motor swash plate 71 are the same as the characteristics described in any aforementioned copending application Serial No. 173,392 filed on February 15, 1962, now Patent No. 3,151,456, and will not be described herein, reference thereto being had. The operation of the pump swash plate control valve 111 and the motor swash plate control valve 112 of the transmission 25 is fully described in my aforementioned copending application Serial No. 209,149 filed on July 11, 1962, now Patent No. 3,157,995. The primary difference between the present disclosure and the above-mentioned prior applications is the provision of the shuttle valve 223 and the two high pressure-low volumetric capacity control pumps 176 and 187 connected in parallel relation so that when either or both of the two shafts 28 and 30 (output and input shafts) rotate at least one of the control pumps will be in operation to provide hydraulic fluid at high pressure (e.g., 5000 p.s.i.) to both control valves 111 and 112 for energizing the hydraulic control cylinders 97, 98, 103 and 104 to position selectively the angular displacements of the swash plates 51 and 71 independently of the hydraulic pressure in the working circuit (i.e., pressure differential between the kidney valves 92 and 93).

Referring now to FIGURE 23, during operation of the transmission 25 the working circuit may be at high pressure (e.g., 5000 p.s.i.) at kidney valve 92 and low pressure at kidney valve 93, or vice versa. Also it is possible that the working circuit will have little or no pressure differential between the kidney valves 92 and 93. However the minimum hydraulic pressure at both kidney valves 92 and 93 is substantially equal to the pressure delivered by the charge pump 200 (e.g., 100 p.s.i.). This minimum pressure from the charge pump 200 is necessary to prevent hydraulic cavitation in the working circuit which could otherwise occur if the low pressure side was below atmospheric pressure. Also a minimum pressure above atmospheric pressure is required for forced lubrication of bearings as previously explained. Now the shuttle valve 223 under the influence of the high pressure side of the working circuit will shift to communicate the low pressure side of the working circuit with the inlet side of the control pumps 176 and 187. Thus as seen in FIGURE 23 the shuttle valve 223 shifts the inlet passage 233 for the control pumps 176 and 187 with passage 210 or 213 whichever is at the lowest pressure. Since the low pressure side of the working circuit is always in communication with the charge pump 200 it becomes immediately apparent that the inlet sides of the control pumps 176 and 187 are always in communication with a source of hydraulic fluid.

The outlet side of the control pumps 176 and 187 are connected together through the high pressure passage 190 as indicated. The high pressure passage 190 in turn communicates with the high pressure port 116 of the pump swash plate control valve 111 and the high pressure port 116' of the motor swash plate control valve 112. Thus it will be seen that if either or both of the control pumps 176 and 187 are in operation, hydraulic fluid at high pressure is available to energize the swash plate control rams 97, 98, 103 and 104 irrespective of whether or not a pressure differential exists in the working circuit. In other words the energizing of the swash plate control rams 97, 98, 103 and 104 does not depend upon the existence of a fluid pressure differential in the working circuit nor the magnitude thereof.

While in the embodiment shown the charge pump 200 is driven by the input shaft 28 it is apparent that the pump 200 may be driven by other means. Also it should be understood that the charge pump 200 may if desired comprise a pair of pumps, one driven by the input shaft 28 and the other driven by the output shaft 30 with their discharge connected in parallel.

Having thus described an embodiment of the invention it can now be seen that the objects of the invention have been fully achieved and it must be understood that changes and modifications may be made which do not depart from the spirit of the invention as disclosed nor from the scope thereof as defined in the appended claims.

What is claimed is:

1. For an infinitely variable speed ratio hydromechanical power transmission device having an input shaft and an output shaft rotatably supported in a housing, a first hydraulic unit drivingly connected to said output shaft and a second hydraulic unit drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a hydraulic control means including a control valve operative to displace angularly at least one of said swash plates selectively for varying the speed ratio of said transmission, a source of hydraulic fluid at high pressure for energizing said hydraulic control means comprising, in combination: a high pressure control pump positioned in one of said hydraulic units and driven by at least one of said shafts, the inlet side of said control pump being communicatively connected to a source of hydraulic fluid at low pressure and the outlet side of said control pump being communicatively connected to said hydraulic control means whereby substantially the entire output of said high pressure control pump is available to energize said hydraulic control means independently of the high pressure side of said working circuit.

2. For an infinitely variable speed ratio hydromechanically power transmission device having an input shaft and an output shaft rotatably supported in a housing, a first hydraulic unit drivingly connected to said output shaft and a second hydraulic unit drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a hydraulic control means including a control valve operative to displace angularly at least one of said swash plates selectively for varying the speed ratio of said transmission, a source of hydraulic fluid at high pressure for energizing said hydraulic control means comprising, in combination: a high pressure control pump positioned in said second hydraulic unit and driven by said input shaft, the inlet side of said control pump being communicatively connected to a source of hydraulic fluid at low pressure and the outlet side of said control pump being communicatively connected to said hydraulic control means whereby substantially the entire output of said high pressure control pump is available to energize said hydraulic control means independently of the high pressure side of said working circuit.

3. For an infinitely variable speed ratio hydromechanical power transmission device having an input shaft and an output shaft rotatably supported in a housing, a first hydraulic unit drivingly connected to said output shaft and a second hydraulic unit drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a hydraulic control means including a control valve operative to displace angularly at least one of said swash plates selectively for varying the speed ratio of said transmission, a source of hydraulic fluid at high pressure for energizing said hydraulic control means comprising, in combination: a high pressure first control pump positioned in said first hydraulic unit and driven by said output shaft, a high pressure second control pump positioned in said second hydraulic unit, said second control pump being in driven relation with said input shaft and said output shaft, the outlet sides of each of said control pumps being communicatively connected to said hydraulic control means whereby the output of said control pumps is available to energize said hydraulic control means independently of the high pressure side of said working circuit.

4. For an infinitely variable speed ratio hydromechanical power transmission device, a source of hydraulic fluid at high pressure for energizing said hydraulic control means according to claim 3 wherein the outlet sides of said control pumps are communicatively connected together in parallel relation whereby the output of said control pumps is combined and made available to energize said hydraulic control means.

5. For an infinitely variable speed ratio hydromechanical power transmission device, a source of hydraulic fluid at high pressure for energizing said hydraulic control means according to claim 3 wherein the inlet sides of said control pumps are communicatively connected to the said low pressure side of said working circuit whereby said low pressure side of said working circuit feeds hydraulic fluid at low pressure to said inlet sides of said control pumps.

6. For an infinitely variable speed ratio hydromechanical power transmission device having an input shaft and an output shaft rotatably supported in a housing, a first hydraulic unit drivingly connected to said output shaft and a second hydraulic unit drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a hydraulic control means including a control valve operative to displace angularly at least one of said swash plates selectively for varying the speed ratio of said transmission, a source of hydraulic fluid at high pressure for energizing said hydraulic control means comprising, in combination: a high pressure control pump means positioned in driven relation with at least one of said shafts, the outlet side of said control pump means being communicatively connected to said hydraulic control means for energizing said control means independently of the high pressure side of said working circuit, a shuttle valve having its outlet side communicatively connected to the inlet side of said control pump means and its inlet side communicatively connected to a plurality of sources of hydraulic fluid whereby said shuttle valve operatively connects communicatively the source of hydraulic fluid at the lowest pressure from said plurality of sources of hydraulic fluid with the inlet side of said control pump means.

7. For an infinitely variable speed ratio hydromechanical power transmission device, a source of hydraulic fluid at high pressure for energizing said hydraulic control means according to claim 6 wherein said shuttle valve is positioned in one of said shafts.

8. For an infinitely variable speed ratio hydromechanical power transmission device, a source of hydraulic fluid at high pressure for energizing said control means according to claim 6 wherein said shuttle valve is positioned in said output shaft.

9. For an infinitely variable speed ratio hydromechanical transmission power device, a source of hydraulic fluid at high pressure for energizing control means according to claim 6 wherein said shuttle valve is actuated by one source of said plurality of sources of hydraulic fluid having a fluid pressure greater than said lowest fluid pressure source.

10. For an infinitely variable speed ratio hydromechanical power transmission device, a source of hydraulic fluid at high pressure for energizing said control means according to claim 9 wherein said plurality of sources of hydraulic fluid comprise the high pressure side and the low pressure side of said working circuit.

11. An infinitely variable speed ratio hydromechanical power transmission device comprising an input shaft and an output shaft rotatably supported in a housing, a first hydraulic unit in said housing drivingly connected to said output shaft and a second hydraulic unit in said housing drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a first hydraulic control means including a first control valve operative to displace angularly said first swash plate for selectively varying the displacement of said first unit, a second hydraulic control means including a second control valve operative to displace angularly said second swash plate for selectively varying the displacement of said second unit, a high pressure control pump means positioned in driven relation with at least one of said shafts, the inlet side of said control pump means being communicatively connected to a source of hydraulic fluid at low pressure and the outlet side of said control pump means being communicatively connected to each of said first and second control valves whereby substantially the entire output of said control pump means is available to energize each of said control means for controlling selectively the speed ratio of said power transmission independently of said high pressure side of said working circuit.

12. An infinitely variable speed ratio hydromechanical power transmission device comprising an input shaft and an output shaft rotatably supported in a housing, a first hydraulic unit in said housing drivingly connected to said output shaft and a second hydraulic unit in said housing drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a first hydraulic control means including a first control valve operative to displace angularly said first swash plate for selectively varying the displacement of said first unit, a second hydraulic control means including a second control valve operative to displace angularly said second swash plate for selectively varying the displacement of said second unit, a high pressure control pump positioned in said second hydraulic unit and driven by at least one of said shafts, the inlet side of said control pump being communicatively connected to a source of hydraulic fluid at low pressure and the outlet side of said control pump being communicatively connected to said first and second hydraulic control means whereby the output of said control pump is available to energize said first and second hydraulic control means independently of the high pressure side of said working circuit.

13. An infinitely variable speed ratio hydromechanical power transmission device comprising an input shaft and an output shaft rotatably supported in a housing, a first hydraulic unit in said housing drivingly connected to said output shaft and a second hydraulic unit in said housing drivenly connected to said input shaft, said first hydraulic unit being a multi-cylinder hydraulic power motor in operative relation with a first swash plate, said second hydraulic unit being a hydraulic power pump in operative relation with a second swash plate, said units being hydraulically interconnected through a hydraulic working circuit having a high pressure side and a low pressure side operative for hydromechanically transmitting power from said input shaft to said output shaft, a first hydraulic control means including a first control valve operative to displace angularly said first swash plate for selectively varying the displacement of said first unit, a second hydraulic control means including a second control valve operative to displace angularly said second swash plate for selectively varying the displacement of said second unit, a high pressure first control pump positioned in said first hydraulic unit and driven by said output shaft, a high pressure second control pump positioned in said second hydraulic unit, said second control pump being in driven relation with said input shaft and said output shaft, the outlet sides of each of said control pumps being communicatively connected to each of said control valves whereby the output of said control pumps is available to energize said first and second hydraulic control means independently of the high pressure side of said working circuit.

14. An infinitely variable speed ratio hydromechanical power transmission device according to claim 13 wherein the outlet sides of said first and second control pumps are combined and communicatively connected to said first and second control valves for energizing each of said first and second hydraulic control means.

15. An infinitely variable speed ratio hydromechanical power transmission device according to claim 13 wherein the inlet sides of said first and second control pumps are communicatively connected to the low pressure side of said working circuit whereby said low pressure side of said working circuit feeds hydraulic fluid at low pressure to said inlet sides of said first and second control pumps.

16. An infinitely variable speed ratio hydromechanical power transmission device according to claim 13 wherein said first and second control pumps are piston pumps.

17. An infinitely variable speed ratio hydromechanical power transmission device according to claim 16 wherein the pistons of said first and second control pumps are disposed in said output shaft and positioned for radial reciprocation therewithin, said pistons being in actuatable relation with cam elements disposed in the cylinder blocks of said hydraulic units whereby relative rotation of said output shaft with respect to said cylinder blocks actuates at least one of said first and second control pumps.

18. An infinitely variable speed ratio hydromechanical power transmission device comprising an input shaft and an output shaft rotatably supported in a housing, a first hydraulic unit in said housing drivingly connected to said output shaft and a second hydraulic unit in said housing drivenly connected to said input shaft, said first hydraulic unit being a multi-cylinder hydraulic power motor in operative relation with a first swash plate, said second hydraulic unit being a multi-cylinder hydraulic power pump in operative relation with a second swash plate, said units being hydraulically interconnected through a hydraulic working circuit having a high pressure side and a low pressure side operative for hydromechanically transmitting power from said input shaft to said output shaft, a first hydraulic control means including a first control valve operative to displace angularly said first swash plate for selectively varying the displacement of said first unit, a second hydraulic control means including a second control valve operative to displace angularly said second swash plate for selectively varying the displacement of said second unit, a high pressure first control pump positioned in said first hydraulic unit and driven by said output shaft, a high pressure second control pump positioned in said second hydraulic unit, said second control pump being in driven relation with said input shaft and said output shaft, the outlet sides of each of said control pumps being communicatively connected to each of said control valves for energizing each of said control means independently of the high pressure side of said working circuit, a shuttle valve having its outlet side communicatively connected to the inlet sides of each of said control pumps, said shuttle valve having its inlet side communicatively connected to a plurality of sources of hydraulic fluid whereby said shuttle valve operatively connects comunicatively the source of hydraulic fluid at the lowest pressure from said plurality of sources of hydraulic fluid with the inlet sides of said first and second control pumps.

19. An infinitely variable speed ratio hydromechanical transmission device according to claim 18 wherein the said shuttle valve is positioned in one of said shafts.

20. An infinitely variable speed ratio hydromechanical power transmission device according to claim 18 wherein the said shuttle valve is positioned in said output shaft.

21. An infinitely variable speed ratio hydromechanical power transmission device according to claim 18 wherein said shuttle valve is actuated by one source of said plurality of sources of hydraulic fluid having a fluid pressure greater than said lowest fluid pressure source.

22. An infinitely variable speed ratio hydromechanical power transmission device according to claim 21 wherein the plurality of sources of hydraulic fluid comprise the high pressure side and the low pressure side of said working circuit whereby the low pressure side of said working circuit feeds hydraulic fluid at low pressure to said inlet sides of said first and second control pumps.

23. An infinitely variable speed ratio hydromechanical power transmission device according to claim 18 wherein said first and second control pumps are piston pumps.

24. An infinitely variable speed ratio power transmission device according to claim 23 wherein the pistons of said first and second control pumps are disposed in said output shaft and positioned for radial reciprocation therewithin, said pistons being in actuatable relation with cam elements disposed in the cylinder blocks of said multi-cylinder power motor and said multi-cylinder power pump whereby relative rotation of said output shaft with respect to said cylinder blocks actuates at least one of said first and second control pumps.

25. An infinitely variable speed ratio hydromechanical power transmission device comprising an input shaft and an output shaft rotatably supported in a housing, a multi-cylinder hydraulic power motor in drive relation with said output shaft, a multi-cylinder hydraulic power pump in driven relation with said input shaft, a first swash plate in drive relation with said output shaft and in operative relation with said power motor, a second swash plate in drive relation with said output shaft and in operative relation with said power pump, said power motor and said power pump being hydraulically interconnected through a hydraulic working circuit having a high pressure side and a low pressure side operative for hydromechanically transmitting power from said input shaft to said output shaft, an auxiliary source of hydraulic fluid at low pressure communicatively connected to said low pressure side of said working circuit for replenishing hydraulic fluid dissipated from said working circuit, a first hydraulic control means including a first control valve disposed in said output shaft operative to displace angularly said first swash plate for selectively varying the fluid displacement of said power motor, a second hydraulic control means disposed in said output shaft operative to displace angularly said second swash plate for selectively varying the fluid displacement of said power pump, a high pressure first control pump disposed in said output shaft having a radially reciprocable first piston, a first cam element disposed in the cylinder block of said power motor and positioned in actuating relation with said first piston, a high pressure second control pump disposed in said output shaft having a radially reciprocable second piston, a second cam element disposed in the cylinder block of said power pump and positioned in actuating relation with said second piston, the output sides of said first and second control pumps being combined and communicatively connected to said first and second control valves for energizing said first and second control means, a shuttle valve disposed in said output shaft having its outlet side communicatively connected to the inlet sides of said first and second control pumps, said shuttle valve having an inlet side, said shuttle valve being actuated by said high pressure side of said working circuit to connect communicatively the inlet side of said shuttle valve with said low pressure side of said working circuit whereby said low pressure side of said working circuit is a source of hydraulic fluid to said first and second control pumps.

References Cited by the Examiner

UNITED STATES PATENTS

| 1,924,017 | 8/33 | Bedford | 60—53 |
| 2,343,386 | 3/44 | Poitras | 60—53 X |
| 2,678,536 | 5/54 | Morgan | 60—53 |
| 3,036,434 | 5/62 | Mark | 60—53 |
| 3,131,540 | 5/64 | Ritter | 60—53 |
| 3,151,456 | 10/64 | Swift | 60—53 |
| 3,157,995 | 11/64 | Swift | 60—53 |

FOREIGN PATENTS 902,185    7/62    Great Britain.

SAMUEL LEVINE, *Primary Examiner.*

EDGAR W. GEOGHEGAN, *Examiner.*